US011868906B2

(12) United States Patent
Srinivasan et al.

(10) Patent No.: US 11,868,906 B2
(45) Date of Patent: *Jan. 9, 2024

(54) SYSTEM AND METHOD FOR FAULT DETECTION OF COMPONENTS USING INFORMATION FUSION TECHNIQUE

(71) Applicant: UTOPUS INSIGHTS, INC., Valhalla, NY (US)

(72) Inventors: Guruprasad Srinivasan, Bangalore (IN); Younghun Kim, Pleasantville, NY (US); Tarun Kumar, Chappaqua, NY (US)

(73) Assignee: Utopus Insights, Inc., Valhalla, NY (US)

( * ) Notice: Subject to any disclaimer, the term of this patent is extended or adjusted under 35 U.S.C. 154(b) by 474 days.

This patent is subject to a terminal disclaimer.

(21) Appl. No.: 17/122,943

(22) Filed: Dec. 15, 2020

(65) Prior Publication Data
US 2021/0216883 A1    Jul. 15, 2021

Related U.S. Application Data
(63) Continuation of application No. 16/234,465, filed on Dec. 27, 2018, now Pat. No. 10,867,250.

(51) Int. Cl.
*G06N 5/02*  (2023.01)
*G06N 3/08*  (2023.01)
*G06N 20/00* (2019.01)

(52) U.S. Cl.
CPC .............. *G06N 5/02* (2013.01); *G06N 3/08* (2013.01); *G06N 20/00* (2019.01)

(58) Field of Classification Search
CPC ............ G06N 20/00; G06N 3/08; G06N 5/02; G06N 5/003; G06N 7/005; G05B 23/0224; G05B 23/0283

(Continued)

(56) References Cited

U.S. PATENT DOCUMENTS

2012/0143565 A1   6/2012  Graham
2013/0204808 A1*  8/2013  Jiang .................. G06N 5/046
                                                706/12

(Continued)

FOREIGN PATENT DOCUMENTS

CN          106870298          6/2017

OTHER PUBLICATIONS

Amruthnath, "Fault Class Prediction in Unsupervised Learning Using Model-Based Clustering Approach", Mar. 2018. (Previously supplied). (Year: 2018).*

(Continued)

*Primary Examiner* — Dave Misir
(74) *Attorney, Agent, or Firm* — Ahmann Kloke LLP

(57) ABSTRACT

An example method comprises receiving historical sensor data of a first time period, the historical data including sensor data of a renewable energy asset, extracting features, performing a unsupervised anomaly detection technique on the historical sensor data to generate first labels associated with the historical sensor data, performing at least one dimensionality reduction technique to generate second labels, combining the first labels and the second labels to generate combined labels, generating one or more models based on supervised machine learning and the combined labels, receiving current sensor data of a second time period, the current sensor data including sensor data of the renewable energy asset, extracting features, applying the one or more models to the extracted features of the current sensor data to create a prediction of a future fault in the renewable energy asset, and generating a report including the prediction of the future fault in the energy asset.

18 Claims, 16 Drawing Sheets

(58) Field of Classification Search
USPC .......................................................... 706/25
See application file for complete search history.

(56) References Cited

U.S. PATENT DOCUMENTS

| | | | | |
|---|---|---|---|---|
| 2016/0092787 | A1* | 3/2016 | Gadde | G06N 20/00 |
| | | | | 706/12 |
| 2017/0308802 | A1 | 10/2017 | Ramsoy | |
| 2018/0096261 | A1* | 4/2018 | Chu | G06N 7/005 |
| 2019/0188584 | A1* | 6/2019 | Rao | G06Q 10/00 |
| 2019/0219994 | A1* | 7/2019 | Yan | G05B 13/027 |
| 2019/0324430 | A1* | 10/2019 | Herzog | G07C 5/006 |

OTHER PUBLICATIONS

Orozco, "Diagnostic Models for Wind Turbine Gearbox Components Using SCADA Time Series Data", 2018 IEEE International Conference on Prognostics and Health Management (ICPHM). (Previously supplied). (Year: 2018).*

Xie, "On Cross-domain Feature Fusion in Gearbox Fault Diagnosis under Various Operating Conditions Based on Transfer Component Analysis", IEEE, 2016. (Previously supplied). (Year: 2016).*

Shao, "An enhancement deep feature fusion method for rotating machinery fault diagnosis", Knowledge-Based Systems 119 (2017) 200-220. (Previously supplied). (Year: 2017).*

International Application No. PCT/US2019/068719, Search Report and Written Opinion dated Mar. 12, 2020.

Amruthnath, Nagdev et al., "Fault Class Prediction in Unsupervised Learning Using Model-Based Clustering Approach," 2018 International Conference on Information and Computer Technologies (ICICT), Mar. 2018.

Orozco, Rafael et al., "Diagnostic Models for Wind Turbine Gearbox Components Using SCADA Time Series Data," 2018 IEEE International Conference on Prognostics and Health Management (ICPHM), Jun. 2018.

Shao, Haidong et al., "An Enhancement Deep Feature Fusion Method for Rotating Machinery Fault Diagnosis," Knowledge-Based Systems, vol. 119, pp. 200-220, Mar. 2017.

Xie, Junyao et al., "On Cross-domain Feature Fusion in Gearbox Fault Diagnosis under Various Operating Conditions Based on Transfer Component Analysis," 2016 IEEE International Conference on Prognostics and Health Management (ICPHM), Jun. 2016.

* cited by examiner

SYSTEM AND METHOD FOR FAULT DETECTION OF COMPONENTS USING INFORMATION FUSION TECHNIQUE

CROSS-REFERENCE TO RELATED APPLICATIONS

This application is a continuation of U.S. patent application Ser. No. 16/234,465, filed on Dec. 27, 2018 and entitled "SYSTEM AND METHOD FOR FAULT DETECTION OF COMPONENTS USING INFORMATION FUSION TECHNIQUE", which is incorporated herein by reference in its entirety.

FIELD OF THE INVENTION

Embodiments of the present invention(s) relate generally to fault detection in electrical networks. In particular, the present invention(s) relate to fault detection in electrical networks through combining labels from a reduced dimension analytic approach with a non-reduced dimension analytic approach to generate models for improved fault detection and action.

DESCRIPTION OF RELATED ART

Detection and prediction of failure in one or more components of an asset of an electrical network has been difficult. Detection of a failure of a component of an asset is tedious and high in errors. In this example, an asset is a device for generating or distributing power in an electrical network. Examples of assets can include, but is not limited to, a wind turbine, solar panel power generator, converter, transformer, distributor, and/or the like. Given that detection of a failure of a component of an asset may be difficult to determine, increased accuracy of prediction of future failures compounds problems.

SUMMARY

An example non-transitory computer readable medium comprising executable instructions, the executable instructions being executable by one or more processors to perform a method, the method comprising receiving historical sensor data of a first time period, the historical data including sensor data from one or more sensors of a renewable energy asset, extracting features from the historical sensor data, performing a unsupervised anomaly detection technique on the historical sensor data to generate first labels associated with the historical sensor data, performing at least one dimensionality reduction technique to generate second labels associated with the historical sensor data, the dimensionality reduction technique reducing a second number of dimensions of the extracted features when compared to a first number of dimensions of the extracted features analyzed using the unsupervised anomaly detection, combining the first labels and the second labels to generate combined labels, generating one or more models based on supervised machine learning and the combined labels, receiving current sensor data of a second time period, the current sensor data including sensor data from at least a subset of the one or more sensors of the renewable energy asset, extracting features from the current sensor data, applying the one or more models to the extracted features of the current sensor data to create a prediction of a future fault in the renewable energy asset, and generating a report including the prediction of the future fault in the renewable energy asset.

In various embodiments, the unsupervised anomaly detection technique includes an isolation forest technique. The at least one dimensionality reduction technique may include a principal component analysis (PCA) technique. The combination of the first and second labels may be combined in a complimentary manner. In one example, wherein generating one or more models based on supervised machine learning and the combined labels includes K-nearest neighbor algorithm or a neural network. In some embodiments, the supervised machine learning includes k-means clustering.

Performing the unsupervised anomaly detection technique on the historical sensor data to generate the first labels may comprise generating an anomaly score based on an output of the supervised anomaly detection techniques and comparing the anomaly score to a threshold to determine if at least one of the first labels should be generated. In various embodiments, performing the at least one dimensionality reduction technique to generate the second labels comprises generating a z-score based on an output of the at least one dimensionality reduction technique and comparing the z-score to a threshold to determine if at least one of the second labels should be generated.

The method may further comprise comparing a fault prediction against a criteria to determine significance of one or more predicted faults and generating an alert based on the comparison, the alert including generating a message identifying the one or more predicted faults.

An example system comprises at least one processor and memory containing instructions, the instructions being executable by the at least one processor to: receive historical sensor data of a first time period, the historical data including sensor data from one or more sensors of a renewable energy asset, extract features from the historical sensor data, perform a unsupervised anomaly detection technique on the historical sensor data to generate first labels associated with the historical sensor data, perform at least one dimensionality reduction technique to generate second labels associated with the historical sensor data, the dimensionality reduction technique reducing a second number of dimensions of the extracted features when compared to a first number of dimensions of the extracted features analyzed using the unsupervised anomaly detection, combine the first labels and the second labels to generate combined labels, generate one or more models based on supervised machine learning and the combined labels, receive current sensor data of a second time period, the current sensor data including sensor data from at least a subset of the one or more sensors of the renewable energy asset, extract features from the current sensor data, apply the one or more models to the extracted features of the current sensor data to create a prediction of a future fault in the renewable energy asset, and generate a report including the prediction of the future fault in the renewable energy asset.

An example method comprises receiving historical sensor data of a first time period, the historical data including sensor data from one or more sensors of a renewable energy asset, extracting features from the historical sensor data, performing a unsupervised anomaly detection technique on the historical sensor data to generate first labels associated with the historical sensor data, performing at least one dimensionality reduction technique to generate second labels associated with the historical sensor data, the dimensionality reduction technique reducing a second number of dimensions of the extracted features when compared to a first number of dimensions of the extracted features analyzed using the unsupervised anomaly detection, combining the first labels and the second labels to generate combined labels, generating one or more models based on supervised machine learning and the combined labels, receiving current sensor data of a second time period, the current sensor data including sensor data from at least a subset of the one or more sensors of the renewable energy asset, extracting features from the current sensor data, applying the one or more models to the extracted features of the current sensor data to create a prediction of a future fault in the renewable energy asset, and generating a report including the prediction of the future fault in the renewable energy asset

DETAILED DESCRIPTION

In wind and solar generation industry, it is important to forecast component failures with additional lead time. Some embodiments described herein utilize machine learning algorithms to build a sophisticated forecasting model based on multi-variate sensor data to forecast component failures. Various embodiments described herein overcome limitations of the prior art by providing scalability, proactive warnings, and computational efficiency while improving accuracy.

In various embodiments described herein, labels based on past data of an electrical network may be generated in at least two different ways. For example, one way is through a reduced-dimensionality approach and another way is through a non-dimensionality reduced approached (or two ways in which dimensions are reduced more in a first method than a second method). The labels may be combined (e.g. "fused" in a complementary method), and then the combined label set may be used to assist in training a model for predicting failures. A dimension in this example may be a feature (e.g., a column or variable) of data.

Figure 1:
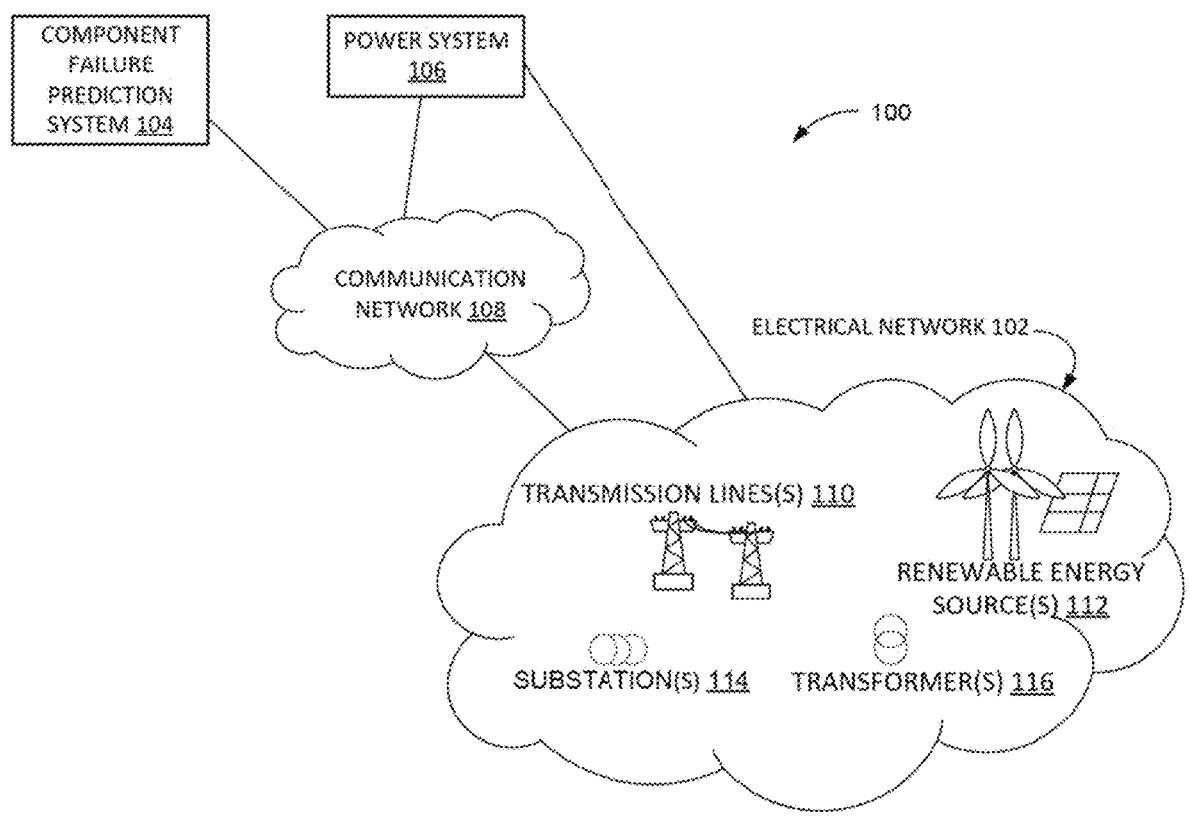
FIG. 1 depicts a block diagram of an example of an electrical network in some embodiments.

FIG. 1 depicts a block diagram 100 of an example of an electrical network 102 in some embodiments. FIG. 1 includes an electrical network 102, a component failure prediction system 104, a power system 106, in communication over a communication network 108. The electrical network 102 includes any number of transmission lines 110, renewable energy sources 112, substations 114, and transformers 116. The electrical network 102 may include any number of electrical assets including protective assets (e.g., relays or other circuits to protect one or more assets), transmission assets (e.g., lines, or devices for delivering or receiving power), and/or loads (e.g., residential houses, commercial businesses, and/or the like).

Components of the electrical network 102 such as the transmission line(s) 110, the renewable energy source(s) 112, substation(s) 114, and/or transformer(s) 106 may inject energy or power (or assist in the injection of energy or power) into the electrical network 102. Each component of the electrical network 102 may be represented by any number of nodes in a network representation of the electrical network. Renewable energy sources 112 may include solar panels, wind turbines, and/or other forms of so called "green energy." The electrical network 102 may include a wide electrical network grid (e.g., with 40,000 assets or more).

Each component of the electrical network 102 may represent one or more elements of their respective components. For example, the transformer(s) 116, as shown in FIG. 1 may represent any number of transformers which make up electrical network 102.

In some embodiments, the component failure prediction system 104 provides failure prediction based on models created from past data from regarding one or more components of the electrical network 102 (as described herein).

In some embodiments, communication network 108 represents one or more computer networks (e.g., LAN, WAN, and/or the like). Communication network 108 may provide communication between any of the component failure prediction system 104, the power system 106, and/or the electrical network 102. In some implementations, communication network 108 comprises computer devices, routers, cables, uses, and/or other network topologies. In some embodiments, communication network 108 may be wired and/or wireless. In various embodiments, communication network 108 may comprise the Internet, one or more networks that may be public, private, IP-based, non-IP based, and so forth.

The component failure prediction system 104 may include any number of digital devices configured to forecast component failure of any number of components and/or generators (e.g., wind turbine or solar power generator) of the renewable energy sources 112.

In various embodiments, the component failure prediction system 104 may reduce computational burden of forecasting failure of any number of components and/or generators by applying machine learning tools on historical data using information fusion as discussed herein.

The power system 106 may include any number of digital devices configured to control distribution and/or transmission of energy. The power system 106 may, in one example, be controlled by a power company, utility, and/or the like. A digital device is any device with at least one processor and memory. Examples of systems, environments, and/or configurations that may be suitable for use with system include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

A computer system may be described in the general context of computer system executable instructions, such as program modules, being executed by a computer system. Generally, program modules may include routines, programs, objects, components, logic, data structures, and so on that perform particular tasks or implement particular abstract data types. A digital device, such as a computer system, is further described with regard to FIG. 13.

Figure 2A:
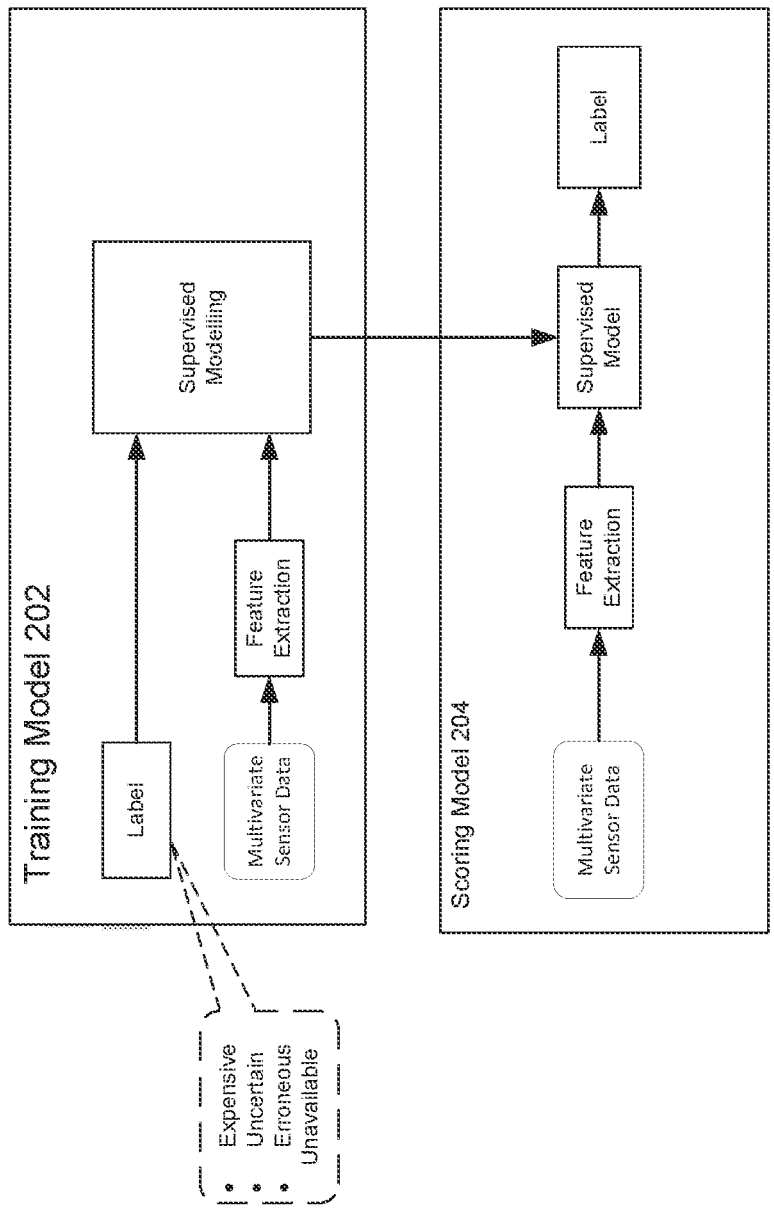
FIG. 2A depicts a training model and scoring model utilized in the prior art.
Figure 2B:
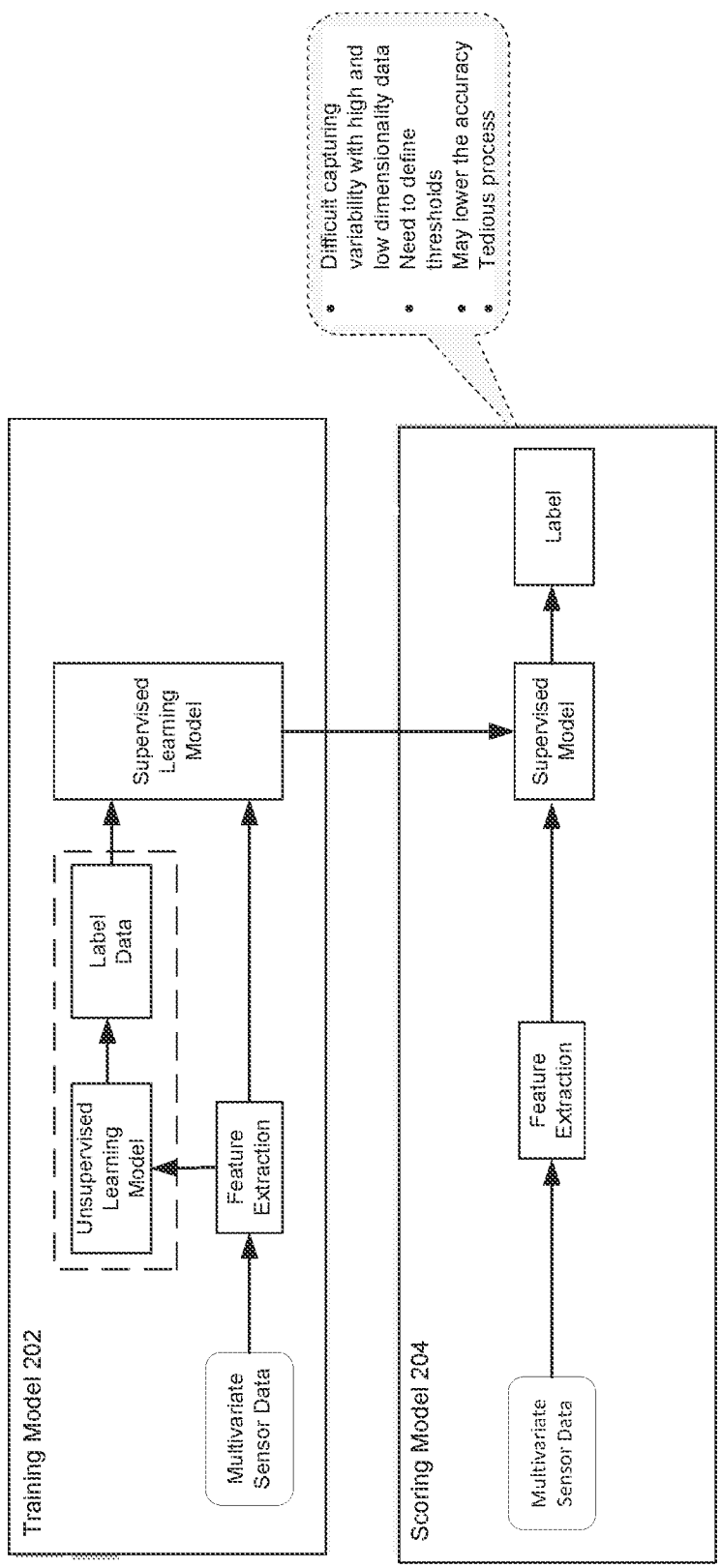
FIG. 2B depicts a training model and scoring model utilized in another example in the prior art

FIGS. 2A and 2B depict different processes of fault detection and fault prediction in the prior art. Both prior art processes depend upon a tedious, computationally efficient, and erroneous process of labeling historical data which is then fed into a supervised learning model to generate models that can be used on new data for detection and prediction of faults. Because of the way in which labeling is completed in the prior art, any model generated by the training model will have limitations including inaccuracies and limitations of variability that impact the application of the model to new data. As a result, labeling of new data by the scoring model is unreliable, open to increased errors, and limited in the variability of data it can accept to make predictions.

FIG. 2A depicts a training model 202 and scoring model 204 utilized in the prior art. In the example depicted in FIG. 2A, historical sensor data may be received from any number of sensors associated with any number of components of an asset (e.g., wind turbines and solar panel generators). The historical sensor data may be multivariate sensor data. Multivariate sensor data is generated by a plurality of sensors received from one or more assets. There may be any number of sensors associated with any number of components. Once models are generated using the historical sensor data, current (new) multivariate sensor data generated by the sensors is received by the scoring model 204 which then utilizes the models from the training model 202 to label and identify existing or future failures.

In the prior art, however, labels utilized in modeling by the training model 202 are often unavailable and unreliable. Labeling sensor data tends to be manual, and, as a result, is slow and expensive. Even if some of the labels are available, the labels tend to be incomplete, uncertain, and/or erroneous. One of the reasons for the unreliable labels is that obtaining reliable historical data is often late due to the manual process of identifying faults and understanding the data. Labeling faults is tedious given the amount of data over a large number of sensors. As a result, errors in the label data makes it difficult to develop more reliable models due to high variance.

Typically, the training model 202 receives the label information (often unreliable and incomplete) from any number of sources. The sources may include individuals who have manually created the label data from the historical sensor data or other historical sensor data. The training model 202 may receive historical data from any number of sensors of any number of electrical assets. The historical data may be multivariate, time series data.

The training model 202 may perform feature extraction and then generate supervised model(s) based on the labels and the features extracted from the historical data. Subsequently, the scoring model 204 may receive current multivariate sensor data from any number of sources, extract features from the data and apply a supervised model to the extracted features to identify applicable labels based on them model(s) from the training model 202.

Once the models are created using the unreliable labels and historical sensor data, the scoring model 204 may receive new (e.g., "current") sensor data from the same or similar sensors of assets. The scoring model 204 may extract features from the current sensor data in a manner similar to that of the training model 202. The scoring model 204 applies to the supervised model generated by the training model 202 to label a state (e.g., condition) of an asset, scenario, or asset as potentially in failure or may be in failure.

As discussed herein, in order for the scoring model 204 to identify failures or forecast failures, the scoring model 204 must rely on the models generated by the training model 202. However, the models generated by the training model 202 depend upon the unreliable label data and, as such, produces errors, affects failure detection, and leads to erroneous predictions.

FIG. 2B depicts a training model 202 and scoring model 204 utilized in another example in the prior art. In order to avoid creating manual labels that may be incomplete and/or erroneous, the training model 202 may utilize an unsupervised learning model to generate the label data from extracted features of the historical sensor data.

In this example, once the training model 202 extracts features in a manner similar to that discussed in FIG. 2A, the training model may apply an unsupervised learning model to generate the label data. Unsupervised learning learns from the extracted features which had not been previously labeled, classified, or categorized. Unsupervised learning identifies commonalities in the data and may react to the presence or absence of such commonalities to generate labels. Unsupervised learning, however, tends to look at similarities (as defined by some metric) in the data to separate the data into groups. The definition and measure of similarities tends to group data unpredictably and in a manner that may not be explainable or accurate.

Once the models are created using the unsupervised learning model labels and historical sensor data, the scoring model 204 receives new (e.g., "current") sensor data from the same or similar sensors of assets. The scoring model 204 extracts features from the current sensor data and then applies the model generated by the training model 202 to label a state (e.g., condition) of an asset, scenario, or asset as potentially in failure or may be in failure.

In order for the scoring model 204 to identify failures or forecast failures, the scoring model 204 must rely on the models generated by the training model 202. However, because of the nature of unsupervised learning, the labels generated by the scoring model 204 have difficulty capturing low variability with high and low dimensionality data. Accuracy can suffer, and the process is tedious as well as computationally inefficient. Further, thresholds need to be defined to make conclusions based on the labels, however, this further lends to inaccurate fault detection and fault prediction (e.g., false positives or incorrect negatives).

Figure 3:
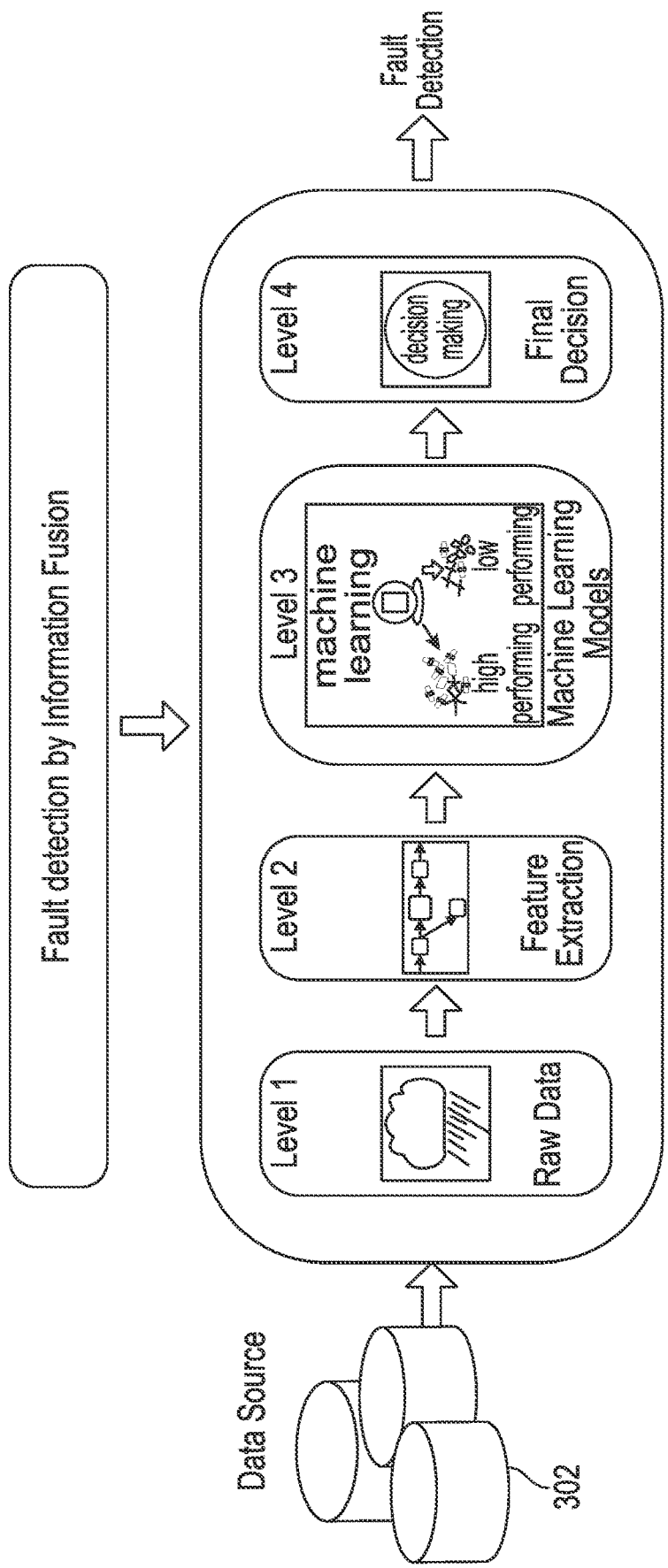
FIG. 3 depicts a block diagram for fault detection and prediction in some embodiments.

FIG. 3 depicts a block diagram for fault detection and prediction in some embodiments. The fault detection and prediction system discussed herein may assist in the detection of component failure and forecast of component failure of assets and electrical network. These assets can include, for example, wind turbines and solar panel generators. Examples of component failures in wind turbines include failures in a main bearing, gearbox, generator, or anemometer. Failures in solar panel generators often occur as a result of failures in an inverter, panel degradation, and an IGBT.

A wind turbine has many potential components of failure. Different sensors may provide different readings for one or more different components or combinations of components. Given the number of wind turbines in a wind farm, the amount of data to be assessed may be untenable using prior art methods. For example, data analytics systems of the prior art do not scale, sensors provide too much data to be assessed by the prior art systems, and there is a lack of computational capacity in prior art systems to effectively assess data from wind farms in a time sensitive manner. As a result, prior art systems are reactive to existing failures rather than proactively providing reports or warnings of potential future failure of one or more components.

For example, various embodiments regarding a wind turbine described herein may identify potential failure of a main bearing, gearbox, generator, or anemometer of one or more wind turbines. Although many bearings may be utilized in a wind turbine (e.g., yaw and pitch bearings), the main shaft and gearbox of the wind turbine tend to be the most problematic. For example, a main bearing may fail due to high thrust load or may fail due to inadequate lubricant film generation. Trends in redesign of a main shaft and/or gearbox of a single wind turbine have been driven by unexpected failures in these units. The unplanned replacement of main-shaft bearing can cost operators up to $450,000 and have an obvious impact on financial performance.

Gearbox failures are one of the largest sources of unplanned maintenance costs. Gearbox failures can be caused by design issues, manufacturing defects, deficiencies in the lubricant, excessive time at standstill, high loading, and other reasons. There may be many different modes of gearbox failure and, as such, it may be important to identify the type of failure mode in addressing the failure. One mode is micropitting which occurs when lubricant film between contacting surfaces in a gearbox is not thick enough. Macropitting occurs when contact stress in a gear or breaking exceeds the fatigue strength of the material. Bending fatigue a failure mode that affects gear teeth and axial cracking may occur in bearings of a gearbox; the cracks develop in the axial direction, perpendicular to the direction of rolling.

The generator typically converts the wind energy to electrical energy. Failures often occur in bearings, stator, rotor, or the like which can lead to inconsistent voltage to total failure. Generator failure may be difficult to detect as a result of inconsistent weather, lack of motion, and/or partial failure of the anemometer.

The anemometer uses moving parts as sensors. Anemometers often include "cups" for wind speed measurements and a wind vane that uses a "vane tail" for measuring vector change, or wind direction. Freezing weather has caused the "cups" and "vane tail" to lock. If an anemometer underreports wind speed because of a partial failure, there is an increase in rotor acceleration that indicates a large amount of wind energy is not converted into electrical engineering. Rolling resistance in an anemometer bearings typically increase over time until they seize. Further, if the anemometer is not accurate, the wind turbine will not control blade pitch and rotor speed as needed. Poor or inaccurate measurements by the anemometer will lead to incorrect adjustments and increased fatigue.

Similarly, various embodiments regarding a solar panel generator described herein may identify potential failure of a inverter, solar panel, and IGBT in one or more solar panels of a solar farm.

A solar inverter is an electrical converter to convert variable direct current from a photovoltaic solar panel into a utility frequency alternating current that can be fed to an electrical grid. Production loses are often attributable to poor performance of inverters. Solar inventers may overheat (caused by weather, use, or failure of cooling systems) which can reduce production. Moisture may cause a short circuit which can cause complete or partial failure (e.g., to a minimum "required" isolation level). Further, failure of the solar inverter to restart after gird fault may require manual restarting of the equipment.

The panel refers to the solar or photovoltaic panel. The photovoltaic panel may degrade due to weather, poor cleaning, thermal cycling, damp heat, humidity freezing, and UV exposure. Thermal cycling can cause solder bond failures and cracks. Damp heat has been associated with delamination of encapsulants and corrosion of cells. Humidity freezing can cause junction box adhesion to fail. UV exposure contributes to discoloration and backsheet degradation.

Solar inverters often use insulated gate bipolar transistors (IGBT) for conversion of solar panel output to AC voltage. Failures in the IGBT can be caused by fatigue, corrosion of metallizations, electromigration of metallizations, conductive filament formation, stress driven diffusion voiding, and time dependent dielectric breakdown.

Returning to FIG. 3, data sources 302 may be or include any sources of data including multivariate sensor data. In some embodiments, the data sources 302 may include the sensors themselves. The data sources 302 may be hosted or operated by the asset/electrical network operator, owner, public utility, and/or the like. For example, the sensors of a plurality of electrical assets may generate time series data which may be collected in the data sources 302 by a public utility, operator, administrator, and/or the like.

The component failure prediction system 104 may receive the multivariate sensor data from one or more of the data sources 302. On level 1, the component failure prediction system 104 receives and/or retrieves the raw data from the multivariate sensor data. On level 2, the component failure prediction system 104 performs feature extraction from the data (e.g., the raw data or directly from the multivariate sensor data). On level 3, the component failure prediction system 104 determines labels and generates one or more machine learning models using the labels.

Machine learning models may be generated utilizing labels using information fusion. Fault detection by information fusion utilizes at least two different methodologies to generate label information from historical sensor data (past data from any number of sensors of any number of electrical devices). For example, the component failure prediction system 104 may first utilize a first process that does not reduce dimensionality of the historical data to generate and/or identify labels. The fault detection by information fusion may also utilize a second process that reduces dimensionality of the historical data and then generates and/or identifies labels. The results of the two processes may be combined (e.g., "fused") to generate combined historical labels that may be utilized to generate one or more models. The models may be utilized by the component failure prediction system 104 to identify new states (e.g., using labels) in new sensor data (e.g., "current sensor data"). In level 4, the component failure prediction system 104 may make decisions using the new states and/or labels (e.g., through thresholding, grouping, classification, and/or the like) to detect and/or predict faults.

Figure 4:
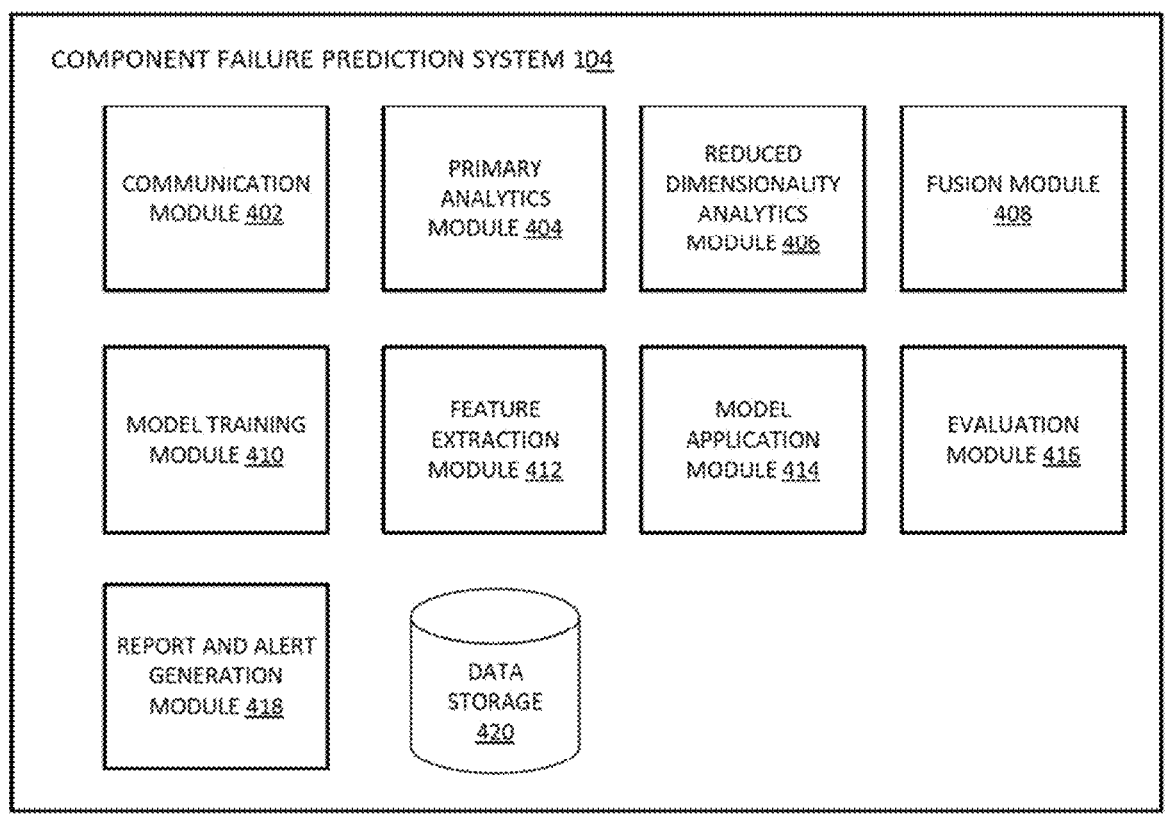
FIG. 4 depicts a component failure prediction system in some embodiments.

FIG. 4 depicts a component failure prediction system 104 in some embodiments. The component failure prediction system 104 comprises a communication module 402, a primary analytics module 404, a reduced dimensionality analytics module 406, fusion module 408, model training module 410, feature extraction module 412, model application module 414, evaluation module 416, report and alert generation module 418, and data storage 420.

In some embodiments, the component failure prediction system 104 receives historical data from any number of sensors of any number of electrical assets, analyzes a reduced dimensionality of the data to identify labels, analyzes a higher dimensionality of the data to also produce labels, and combine the two sets of labels to assist in model training. Models that are produced from this process may then be utilized to detect and/or predict failures of one or more components of the one or more electrical assets.

The communication module 402 may be configured to transmit and receive data between two or more modules in component failure prediction system 104. In some embodiments, the communication module 402 is configured to receive information (e.g., historical sensor data and/or current sensor data) regarding assets of the electrical network 102 (e.g., from the power system 106, sensors within components of the electrical network 102 such as the renewable energy sources 112, third-party systems such as government entities, other utilities, and/or the like).

The communication module 402 may be configured to receive historical data regarding electrical assets either individually or in combination (e.g., wind turbines, solar panels, windfarms, solar farms, components of devices, components of wind turbines, components of solar panels, substations 114, transformers 116, and/or transmission lines 110). The communication module 402 may further receive sensor data from one or more sensors of any number of electrical assets such as those described above.

The feature extraction module 412 may extract features (e.g., dimensions and/or variables) from the received historical sensor data. The multivariate sensor data may, as discussed herein, be time series data. For example, the feature extraction module 412 may extract features from the time series data. The feature extraction module 412 may provide the extracted features to the primary analytics module 404 and the reduced dimensionality analytics module 406.

In various embodiments, feature extraction may also refer to the process of creating new features from an initial set of data. These features may encapsulate central properties of a data set and represent the data set and a low dimensional space that facilitates learning. As can be appreciated, the initial multivariate sensor data may include a number of features that are too large and unwieldy to be effectively managed and may require an unreasonable amount of computing resources. Feature extraction may be used to provide a more manageable representative subset of input variables. It will be appreciated that feature extraction may extract features for the data as well as create new features from the initial set of data.

It will be appreciated that, in some embodiments, dimensions may refer to columns (e.g., features or variables) of the received historical sensor data.

The primary analytics module 404 may receive historical sensor data from the communication module 402 or extracted features of the received historical sensor data from the feature extraction module 412. The number of dimensions of the historical sensor data and/or number of dimensions of the extracted features analyzed by the primary analytics module 404 may be greater than the number of dimensions of the historical sensor data and/or number of dimensions of the extracted features analyzed by the reduced dimensionality analytics module 406. Examples of processes of analysis by the primary analytics module 404 are discussed herein.

The reduced dimensionality analytics module 406 may reduce dimensionality of all or some of the historical sensor data and/or extracted features before analyzing the data. In some embodiments, dimensionality reduction may be utilized to map timeseries to a lower dimensional space. Time series data may be decomposed into components that represent one or more patterns. The components, or the parameters associated with the patterns, represent features of a time series that can be used in models. For example, time series data may be clustered into common patterns. Trend and classical decomposition may utilize a series of moving averages to decompose time series data to extract features.

It will be appreciated that any form of decomposition and/or feature extraction may be utilized. For example, instead of trend decomposition, singular spectrum analysis that applies an adaptation of principal component analysis (PCA) may be utilized to decompose time series data. Principal components may then be utilized to forecast and model each separately and, in some embodiments, aggregate the component series forecasts to forecast the original series.

Figure 5:
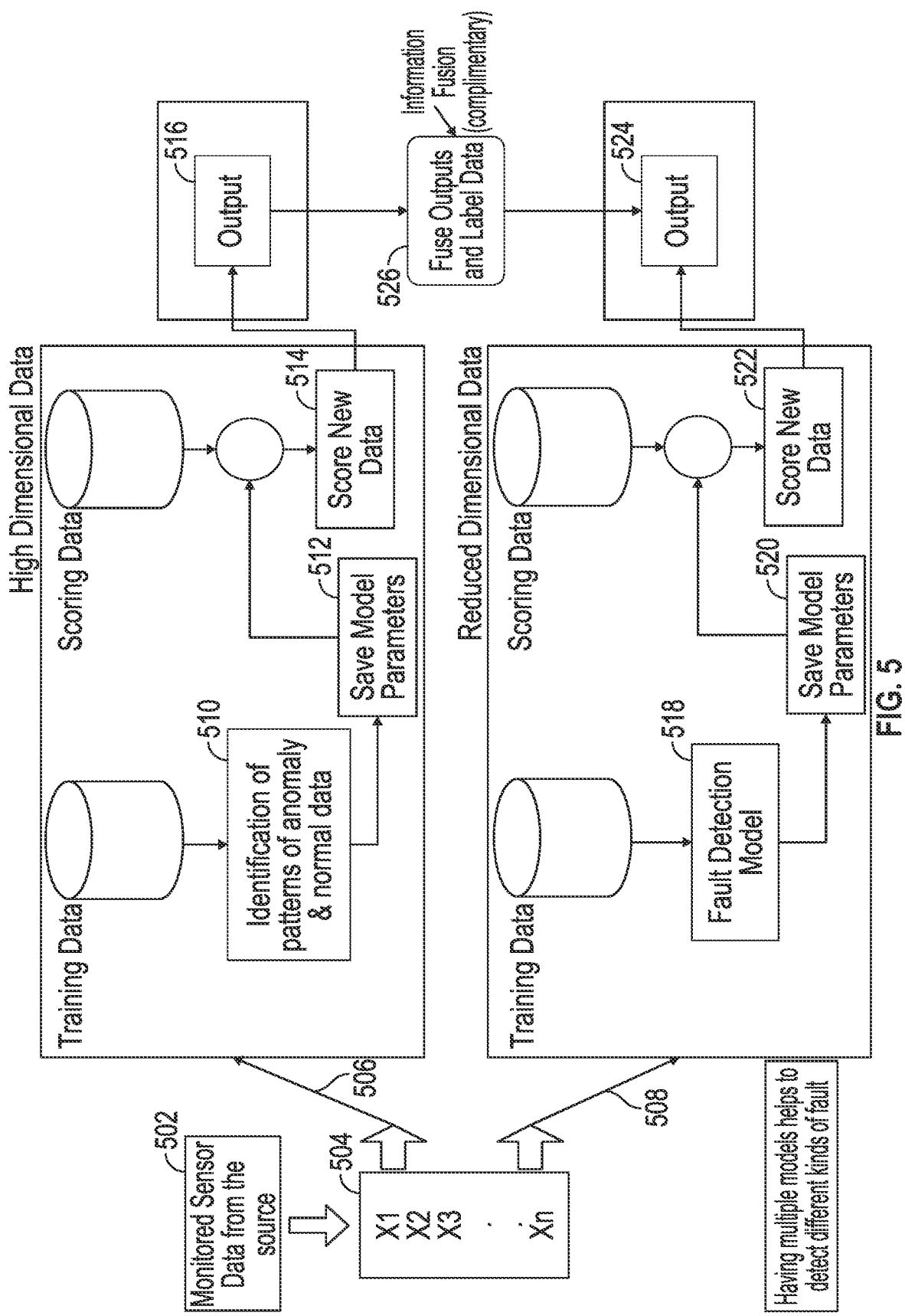
FIG. 5 depicts an example process where historical sensor data of a higher dimensionality is analyzed, the same historical sensor data of a lower (reduced) dimensionality is separately analyzed, and labels generated by the two separate analytical processes are combined.

FIG. 5 depicts an example process where historical sensor data of a higher dimensionality is analyzed, the same historical sensor data of a lower (reduced) dimensionality is separately analyzed, and labels generated by the two separate analytical processes are combined. In some embodiments, features may be extracted from the historical sensor data by the feature extraction module 412. The primary analytics module 404 may analyze the extracted data of the received historical sensor data without reducing the dimensionality of the extracted features. In various embodiments, the primary analytics module 404 reduces dimensionality of the extracted features but there is greater dimensionality than that which is reduced by the reduced dimensionality analytics module 406. Similarly, the reduced dimensionality analytics module 406 may receive the extracted features and further reduce the dimensionality of the extracted features.

In the example of step 502 the communication module 402 receives monitored sensor data from any number of sources. Monitored sensor data may be historical sensor data from any number of sources of any number of electrical assets of an electrical network. In some embodiments, a portion of the historical sensor data may be analyzed and another portion of the struggles sensor data may be used to test models (e.g., against historical data with ground truth to determine the accuracy of the models). In step 504, the feature extraction module 412 may extract features from the historical sensor data received by the communication module 402.

The communication module 402 may send any amount of the historical sensor data (e.g., the extracted features) to the primary analytics module 404 in step 506 and may send the same historical sensor data (e.g., the same extracted features) to the reduced dimensionality analytics module 406 in step 508. In this example, the primary analytics module 404 and the reduced dimensionality analytics module 406 receive the same data. In some embodiments, the primary analytics module 404 and the reduced dimensionality analytics module 406 receive different data.

In various embodiments, the feature extraction module 412 extracts features from the historical sensor data received from the communication module 402 and then provides the extracted features (e.g., the same extracted features) to the primary analytics module 404 and the reduced dimensionality analytics module 406. It will be appreciated that there may be any number of feature extraction modules 412 that may individually provide extracted features to the primary analytics module 404 and reduced dimensionality analytics module 406.

In some embodiments, the primary analytics module 404 analyzes the received data (e.g., extracted features) without reducing the dimensionality of the data. In various embodiments, the primary analytics module 404 reduces dimensionality of the data but there is greater dimensionality after reduction than after reduction performed by the reduced dimensionality analytics module 406.

In this example, the primary analytics module 404 analyzes the received data without reducing the dimensionality of the data. The primary analytics module 404 may perform anomaly detection (e.g., outlier detection) on the received historical sensor data to identify data, events, or observations that differ from the majority of the received historical sensor data. Anomalies may be referred to as novelties, noise, deviations, or exceptions.

The primary analytics module 404 may perform, for example, unsupervised anomaly detection techniques to detect anomalies in unlabeled received historical sensor data. Anomalies may be detected by identifying instances that appear to fit least in the data set. The primary analytics module 404 may perform any type of analytics. For example, the primary analytics module 404 may perform k-nearest neighbor, local outlier factor, or isolation forests on the received historical sensor data.

In one example, the primary analytics module 404 may analyze the received historical data using isolation forests. Isolation in this example means "separating an instance from the rest of the instances." Since there may be few and different anomalies, they are more susceptible to isolation. In a data-induced random tree, partitioning of instances may be repeated recursively until instances are isolated. Random partitioning may produce noticeable shorter paths for anomalies since (a) the fewer instances of anomalies result in a smaller number of partitions—shorter paths in a tree structure, and (b) instances with distinguishable attribute-values are more likely to be separated in early partitioning. As a result, when a forest of random trees collectively produce shorter path lengths for some particular points, then they are highly likely to be anomalies.

For example, partitions may be generated by randomly selecting an attribute and then randomly selecting a split value between the maximum and minimum values of the selected attribute. Since recursive partitioning can be represented by a tree structure, the number of partitions required to isolate a point may be equivalent to the path length from the root node to a terminating node. Since each partition is randomly generated, individual trees may be generated with different sets of partitions. Path lengths may be averaged over a number of trees to find the expected path length.

In step 510 in this example, the primary analytics module 404 may perform anomaly detection (e.g., using isolation forests) to identify a pattern of anomaly and normal data (e.g., based, in part, on path lengths). In step 512, the primary analytics module 404 may determine model parameters of different potential models determined using the isolation forests and then may score the data in step 514 to output labels in step 516.

For example, utilizing isolation forests, the primary analytics module 404 may detect anomalies in the received historical data and rank the anomalies by degree of anomaly (e.g., based on length of path and/or in comparison to "normal" data). The primary analytics module 404 may sort data points according to their path lengths or anomaly scores. A path length of a point may be measured by the number of edges the point transverses a tree from the toot node until the traversal is terminated at an external node.

The primary analytics module 404 may generate an anomaly score. For example, the primary analytics module 404 may estimate an average path length of a tree. Given a data set of n instances, the average path length of unsuccessful search in Binary Search Tree may be:

$$c(n)=2H(n-1)-(2(n-1)/n)$$

where H(i) is the harmonic number and it can be estimated by ln(i)+0.5772156649 (Euler's constant). As c(n) is the average of h(x) given n, it can be used to normalise h(x). The anomaly score s of an instance x may be defined as:

$$s(x, n) = 2^{\frac{-E(h(x))}{c(n)}}$$

where E(h(x)) is the average of h(x) from a collection of isolation trees.

In various embodiments, the primary analytics module 404 may label and output anomalies in step 514. For example, the primary analytics module 404 may compare each anomaly score to a threshold to determine if a significant anomaly has been detected and should be labeled. The threshold may be based on the anomaly scores (e.g., based on a distribution or averaging), the likelihood of fault (e.g., an expected likelihood based at least in part on probability), the historical sensor data, or in any number of ways.

In parallel, serial, or asynchronously, the reduced dimensionality analytics module 406 may analyze the received historical sensor data (e.g., the extracted features of the received historical sensor data) by reducing dimensionality and/or analyzing the historical sensor data using analysis that reduces the dimensionality of the data. In one example, the reduced dimensionality analytics module 406 may perform principal component analysis (PCA) (e.g., using the covariance method) on the received historical sensor data to determine uncorrelated variables (distinct principal components) in the data. The transformation of the data may capture much of the variability in the data. The resulting vectors may be an uncorrelated orthogonal basis set.

For example, the reduced dimensionality analytics module 406 may determine an empirical mean along each dimension (e.g., column) of the historical sensor data, calculate deviations from the mean, and find the covariance matrix from the outer product (e.g., of the mean-subtracted data matrix). The reduced dimensionality analytics module 406 may find the covariance matrix and find the eigenvectors and eigenvalues of the covariance matrix. The columns of eigenvector matrix and the eigenvalue matrix may be sorted in decreasing eigenvalue (maintaining the correct pairings between the two matrixes), and a cumulative energy content may be computed for each eigenvector. The reduced dimensionality analytics module 406 may select a subset of the eigenvectors as basis vectors and project z-scores of the data onto the new basis.

While PCA is discussed herein, It will be appreciated that this is only one example, there may be any number of analytical methods to apply reduced dimensionality analysis to the received historical sensor data.

The reduced dimensionality analytics module 406 may generate a fault detection model based on the principal components of the data in step 518 and save model parameters in step 520. In step 522, the reduced dimensionality analytics module 406 may score the new data to generate label output in step 524.

In various embodiments, the reduced dimensionality analytics module 406 may label and output the labels in step 524. For example, the reduced dimensionality analytics module 406 may compare each score to a threshold to determine if a significant anomaly has been detected and should be labeled. The threshold may be based on the z scores, the likelihood of fault (e.g., an expected likelihood based at least in part on probability), the historical sensor data, or in any number of ways.

In step 526, the fusion module 408 may fuse the two sets of labels. For example, the fusion module 408 may combine (e.g., in a complementary fashion) the two sets of labels. The combined set of labels (e.g., fused labels) may be utilized by a supervised machine learning module to generate models for the application of current sensor data to detect and/or predict faults.

Figure 6:
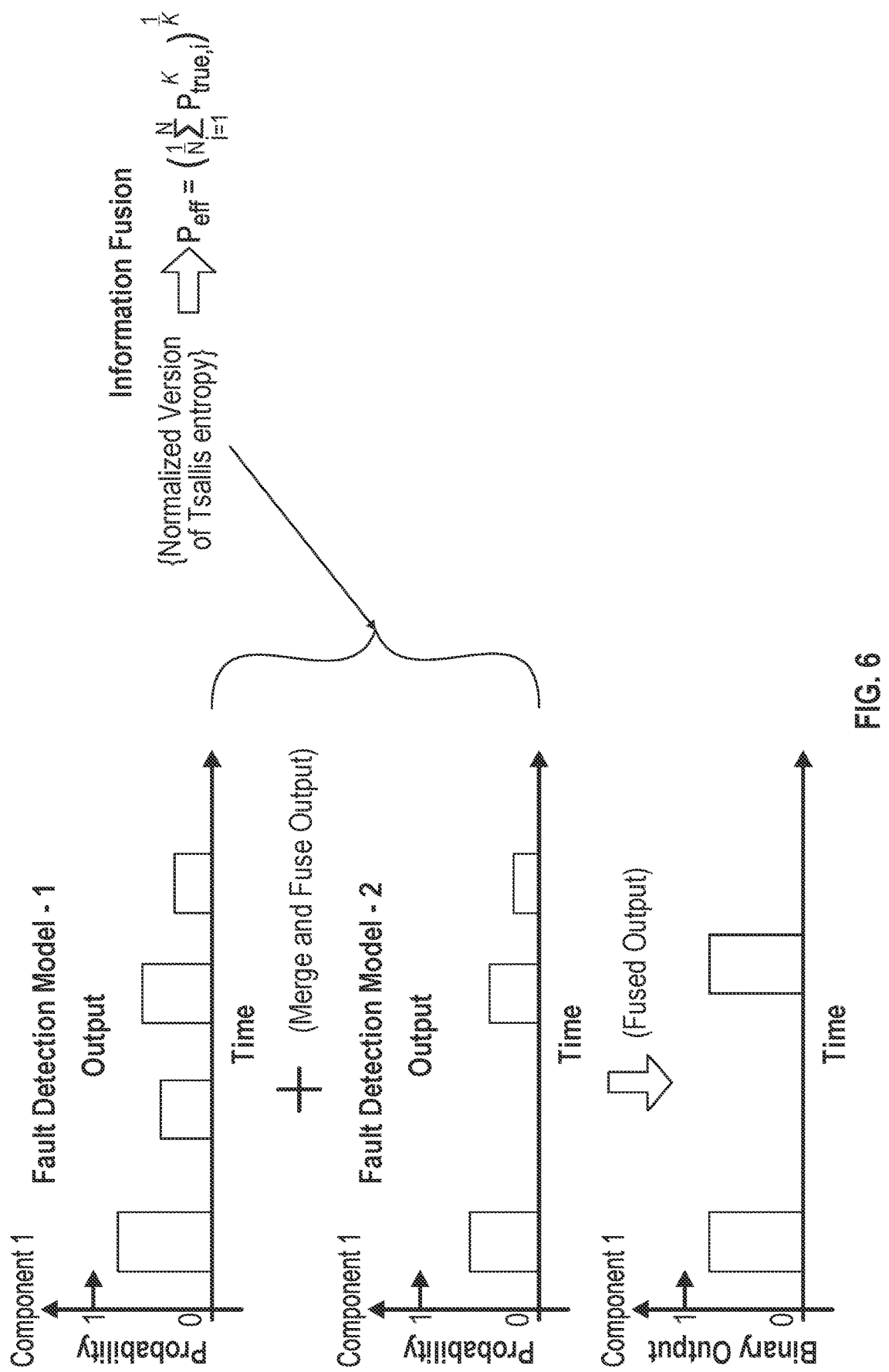
FIG. 6 depicts information fusion in some embodiments.

FIG. 6 depicts information fusion in some embodiments. The output (e.g., labels) of the fault detection model 1 output (e.g., the output of the primary analytics module 404) may be merged with the output (e.g., labels) of the fault detection model 2 (e.g., the output of the reduced dimensionality analytics module 406) to create combined labels. For example, the merging of the two outputs may be a normalized version of Tsallis entropy $$\left(\text{e.g., } P_{\textit{eff}} = \left(\frac{1}{N}\sum_{i=1}^{N} P_{\textit{tru e,i}}^{K}\right)^{\frac{1}{K}}\right).$$

The fused output may exploit information obtained from high dimensional data and transformation of data possibly correlated variables into a set of values of linearly uncorrelated variables. As a result, the combination may be a preferred solution where accuracy is improved.

Figure 7A:
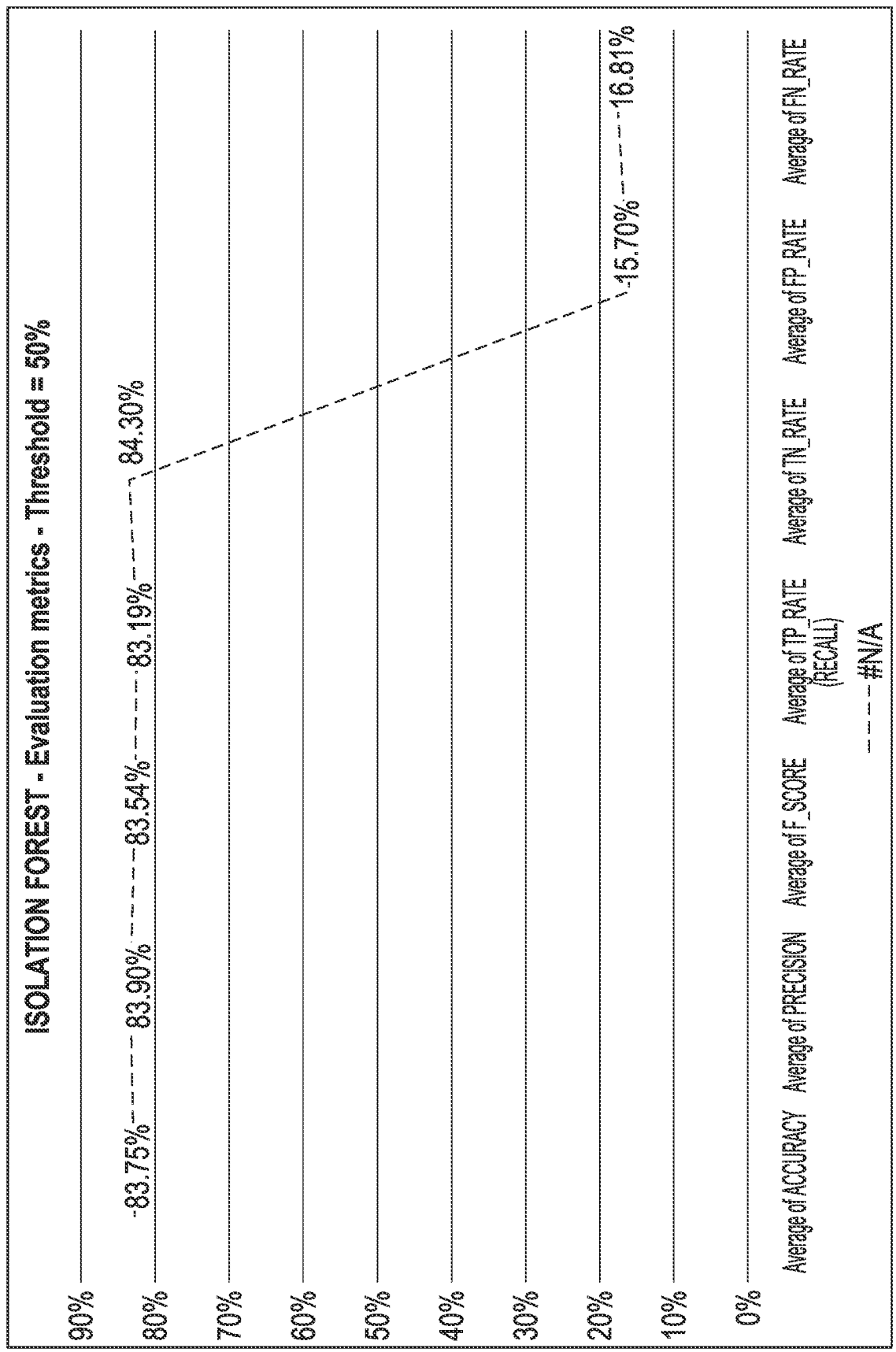
FIG. 7a depicts the results of running an isolation forest analysis on sensor data with a threshold of 50% as an example.

FIG. 7a depicts the results of running an isolation forest analysis on sensor data with a threshold of 50% as an example. In this example, the primary analytics module 404 may apply isolation forests to extracted features of the historical sensor data. The results are depicted in FIG. 7a.

Figure 7B:
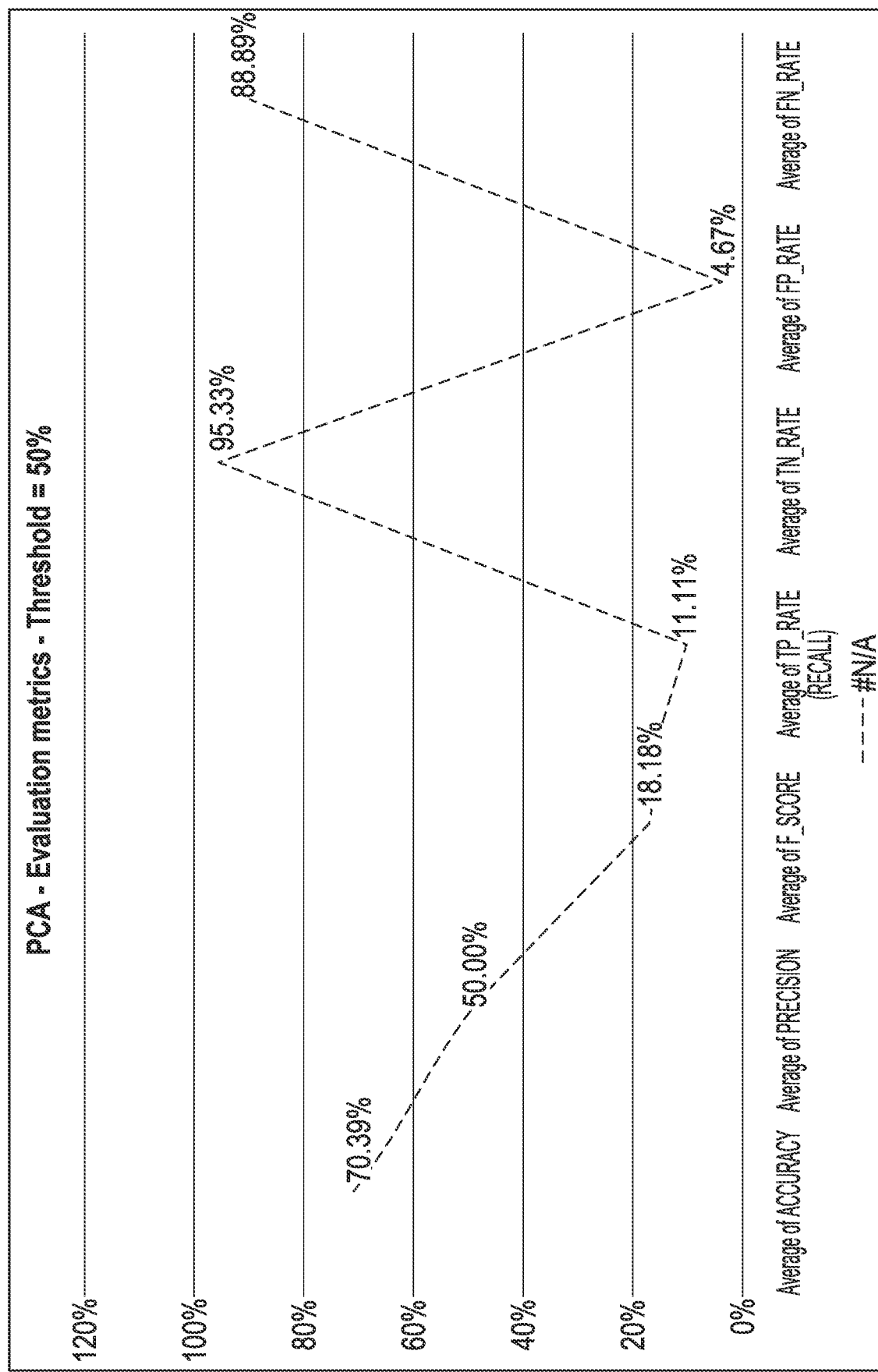
FIG. 7b depicts the results of running a PCA analysis on sensor data with a threshold of 50% as an example.

FIG. 7b depicts the results of running a PCA analysis on sensor data with a threshold of 50% as an example. In this example, the reduced dimensionality analytics module 406 may apply PCA analysis to the same extracted features of the same historical sensor data. The results are depicted in FIG. 7b.

FIGS. 7a and 7b depict capturing different information from the same extracted features of the historical sensor data.

Figure 7C:
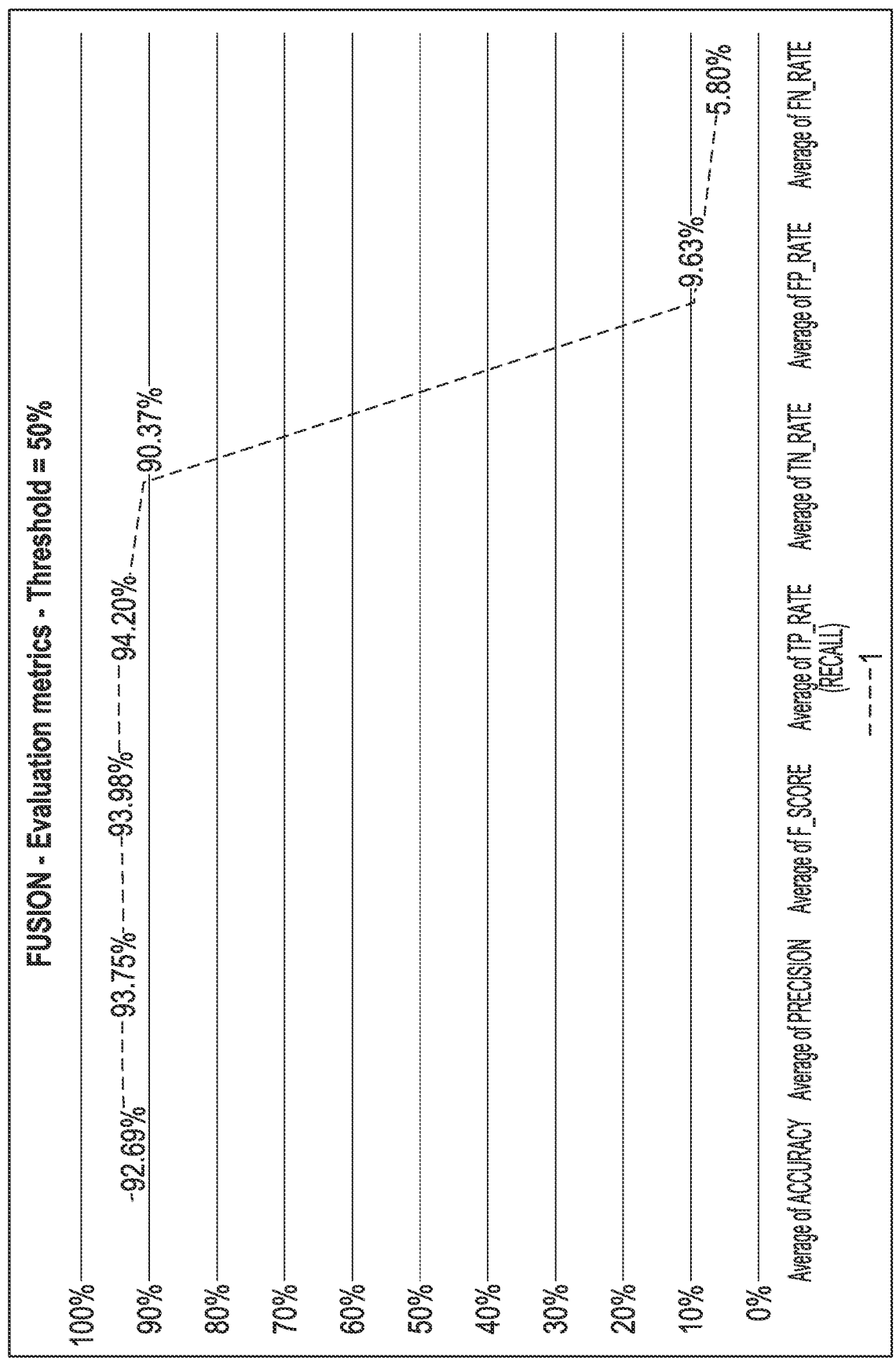
FIG. 7c depicts example results of fusing the results of the isolation forest analysis and the PCA analysis

FIG. 7c depicts example results of fusing the results of the isolation forest analysis and the PCA analysis. In this example, the fusion module 408 may fuse the labels produced from the primary analytics module 404 and the reduced dimensionality analytics module 406. The example results of FIG. 7c depict an improvement in prediction and accuracy of failure detection.

Returning to FIG. 4, the model training module 410 may utilize a supervised learning model to create a supervised model capable of detecting and/or predicting faults in the assets. In various embodiments, the model training module 410 utilizes the combined labels from the fusion module 408 to create the supervised model(s). It will be appreciated that many supervised different learning models may be utilized. For example, the model training module 410 may utilize support vector machines, linear regression, logistic regression, naïve Bayes, linear discriminant analysis, decision trees, K-nearest neighbor algorithm, and neural networks.

The model application module 414 may apply the model(s) generated by the model training module 410 to new sensor data (e.g., current sensor data). For example, once the model(s) are generated, the component failure prediction system 104 may receive current (e.g., new) data from any number of sensors (e.g., the same sensors that provided the historical sensor data and/or other sensors) to detect and/or predict failures.

The evaluation module 416 may be configured to evaluate the results form the model application module 414. In various embodiments, the results from the application of the model(s), the evaluation module 416 may apply thresholds or triggers to identify failures or predictions of failures (e.g., significant failures or failures of with sufficient confidence).

The report and alert generation module 418 may generate a report including the results of the application of the model(s) to identify components and/or assets that are expected to suffer a failure (and/or are suffering a failure). In various embodiments, the report may indicate a timeframe after or at which the failure is expected to occur. The report and alert generation module 418 may provide the report to the operator, utility, maintenance service devices, and/or the like.

In various embodiments, the report and alert generation module 418 may generate an alert based on the results of the application of the model(s). For example, the report and alert generation module 418 may provide alert communications (e.g., email, SMS text, phone calls, and/or the like) to devices to indicate a significant failure prediction or current failure. The report and alert generation module 418 may compare the results from the application of the model(s) to any number of criteria to determine significance. The criteria may include, but not be limited to, a number of failures in close proximity to each other, a number of failures, significance of one or more failures (e.g., risking an asset as a whole, impacting other assets, or impacting the electrical network), and/or the impact the failure may have to critical or important services.

The data storage 420 may include any number of data storage devices and or logical storage spaces. The data storage 420 may include, for example, any number of databases, tables, and/or any other data structures. The data storage 420 may be configured to store any amount of historical sensor data, current sensor data, extracted features, generated models, labels, results of application of models to current sensor data, reports, and/or alerts.

In some embodiments, after the model training module 410 generates a new model using the fused information, the communication module 402 receives current sensor data, the feature extraction module 412 may extract features from the current sensor data, and the model application module 414 may apply the model from the model training module 410 to analyze the current sensor data to detect and/or predict failures.

Figure 8:
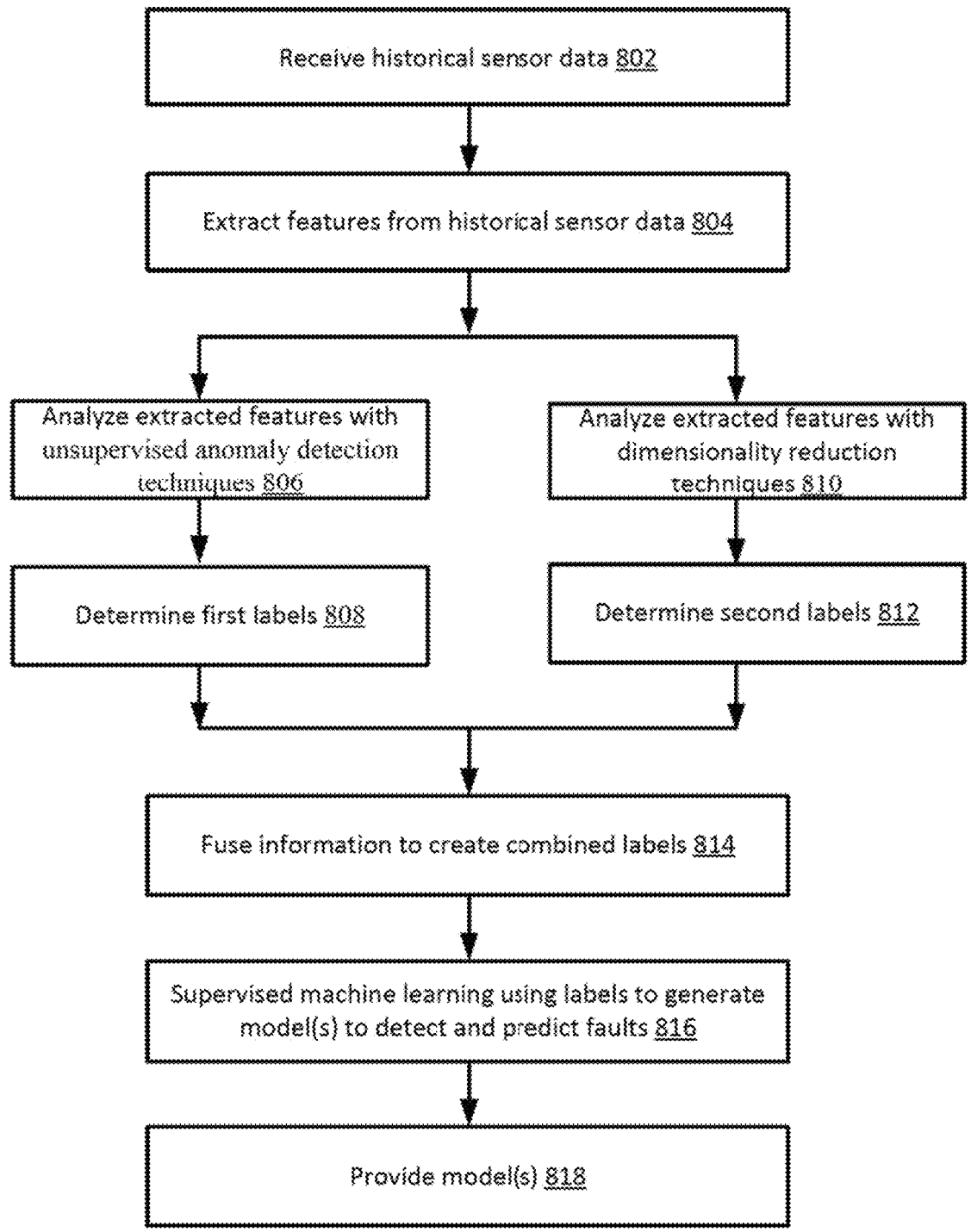
FIG. 8 depicts a flow chart for creating models using label fusion in some embodiments.

FIG. 8 depicts a flow chart for creating models using label fusion in some embodiments. In step 802, the communication module 402 receives historical sensor data. The historical sensor data may include data generated by sensors in the past and include known faults of any number of components of an electrical asset. In step 804, the feature extraction module 412 may extract features from the historical sensor data. The features may include, but not be limited to, dimensions such as measurements from the sensors or combinations of measurements. In some embodiments the features may include a function performed on any amount of sensor data (e.g., any number of measurements).

In step 806, the primary analytics module 404 may analyze extracted features with unsupervised anomaly detection techniques. Such a technique may include, for example, isolation forests. In step 808, the primary analytics module 404 may determine first labels. First labels may be generated from the unsupervised anomaly detection techniques.

In step 810, the reduced dimensionality analytics module 406 may analyze the same extracted features with dimensionality reduction techniques. Such a technique may include, for example, PCA. In step 812, the reduced dimensionality analytics module 406 may determine second labels.

In step 814, the fusion module 408 may receive the first labels and the second labels to fuse information to create a set of combined labels. The fusion module 408 may combine the first labels and the second labels in a complementary manner. For example the first labels may be added to the second labels to generate the combined labels (e.g., reducing duplicates).

In step 816, the model training module 410 may utilize supervised machine learning using the combined labels to generate one or more models to detect and predict faults. By utilizing a set including all or some of the first and second labels the model training module 410 increases the accuracy of the resulting detection of faults, increases time for prediction of faults, or both. It will be appreciated that, in some embodiments, by utilizing a set including all or some of the first and second labels the model training module 410 increases the accuracy of the resulting detection of faults without increasing the time of prediction.

In step 818, the model training module 410 may provide the one or more models to data storage 420 and/or the model application module 414.

Figure 9:
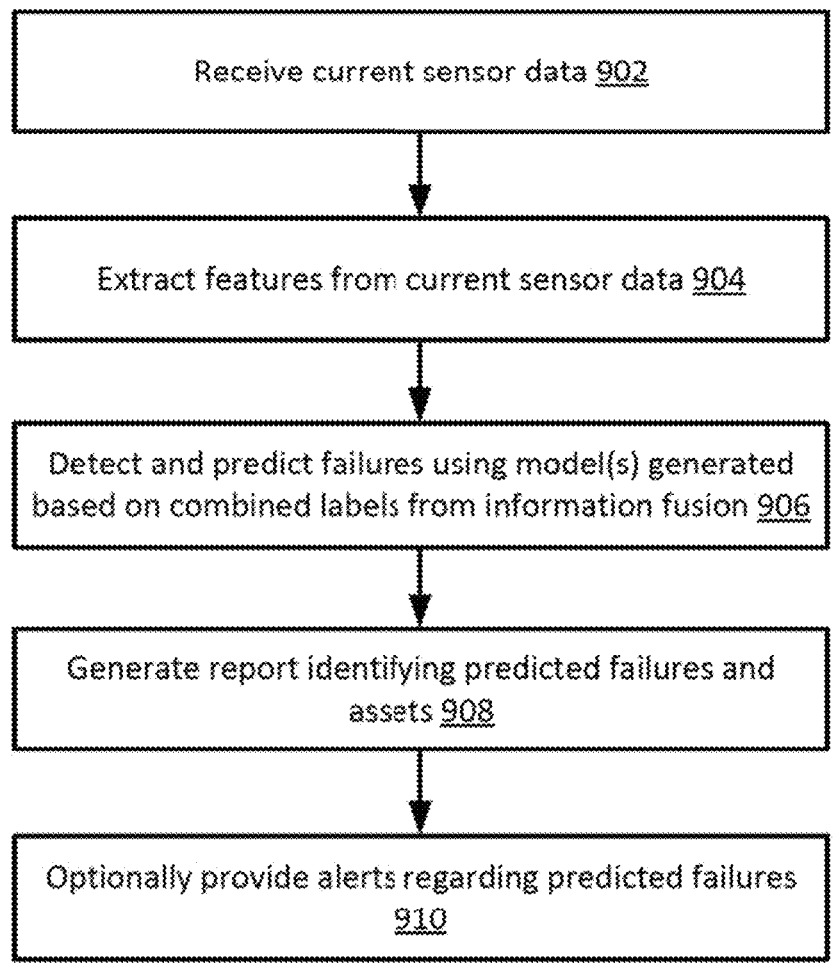
FIG. 9 depicts a flow chart for applying models using label fusion in some embodiments.

FIG. 9 depicts a flow chart for applying models using label fusion in some embodiments. As discussed herein, the component failure prediction system 104 may improve and accuracy and/or time to predict failure using the combined labels. In step 902, the communication module 402 may receive current sensor data. The current sensor data may be from the same sensors that provided the historical sensor data, different sensors, or combination of sensors (e.g., those that provided at least some of the historical data as well as others).

In step 904, the feature extraction module 412 extract features in the current sensor data (e.g., the recently received sensor data as opposed to historical data received in the past). In some embodiments, the feature extraction module 412 extract features from the current sensor data in the same manner as features that were extracted from the historical sensor data.

In step 906, the model application module 414 applies the models from the model training module 410 to the extracted features of the current sensor data to detect and/or predict failures. As discussed herein, the model from the model training module 410 may be generated using the combined labels from the fusion module 408.

In step 908, report and alert generation module 418 generates reports identifying predictive failures and identifying assets or components of assets. In some embodiments the report may identify the significance of the type of failure, the impact of the failure of the asset, the impact of failure on the network, the expected timeframe of the failure, the impact of failure on critical services (such as on a hospital or during extreme weather), and/or the like.

Figure 10:
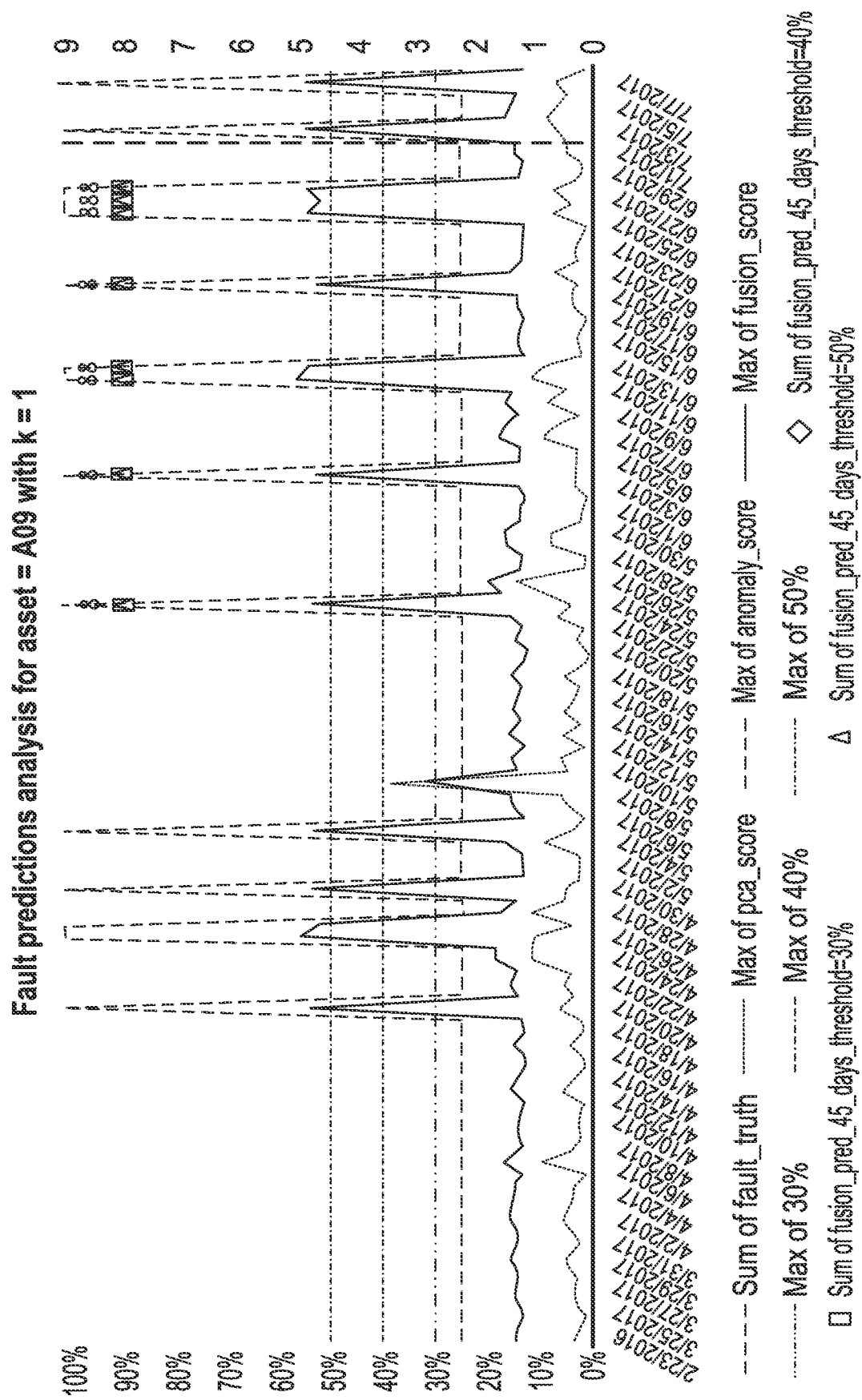
FIG. 10 depicts an example report for fault and prediction analysis for an electrical asset using information fusion.

FIG. 10 depicts an example report for fault and prediction analysis for an electrical asset using information fusion. In this example, known faults were accurately predicted 45 days in advance of the fault, using different threshold predictions. For example, using a 30% threshold, 40% threshold, or 50% threshold, faults are accurately predicted 45 days in advance.

Figure 11:
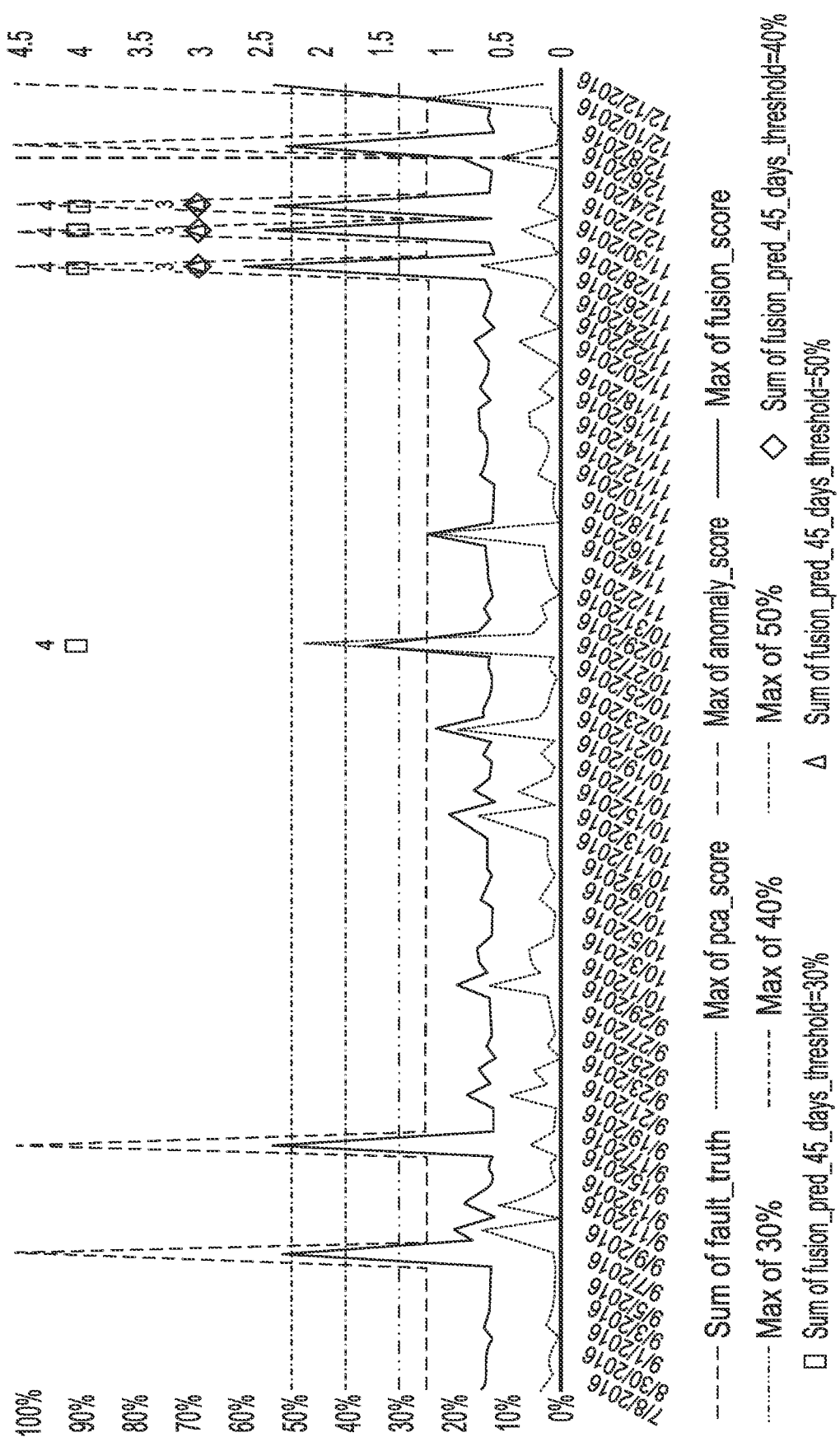
FIG. 11 depicts an example report for fault and prediction analysis for another electrical asset using information fusion.

FIG. 11 depicts an example report for fault and prediction analysis for another electrical asset using information fusion. In this example, known faults were accurately predicted 45 days in advance of the fault, using different threshold predictions. For example, using a 30% threshold, 40% threshold, or 50% threshold, faults are accurately predicted 45 days in advance.

Figure 12:
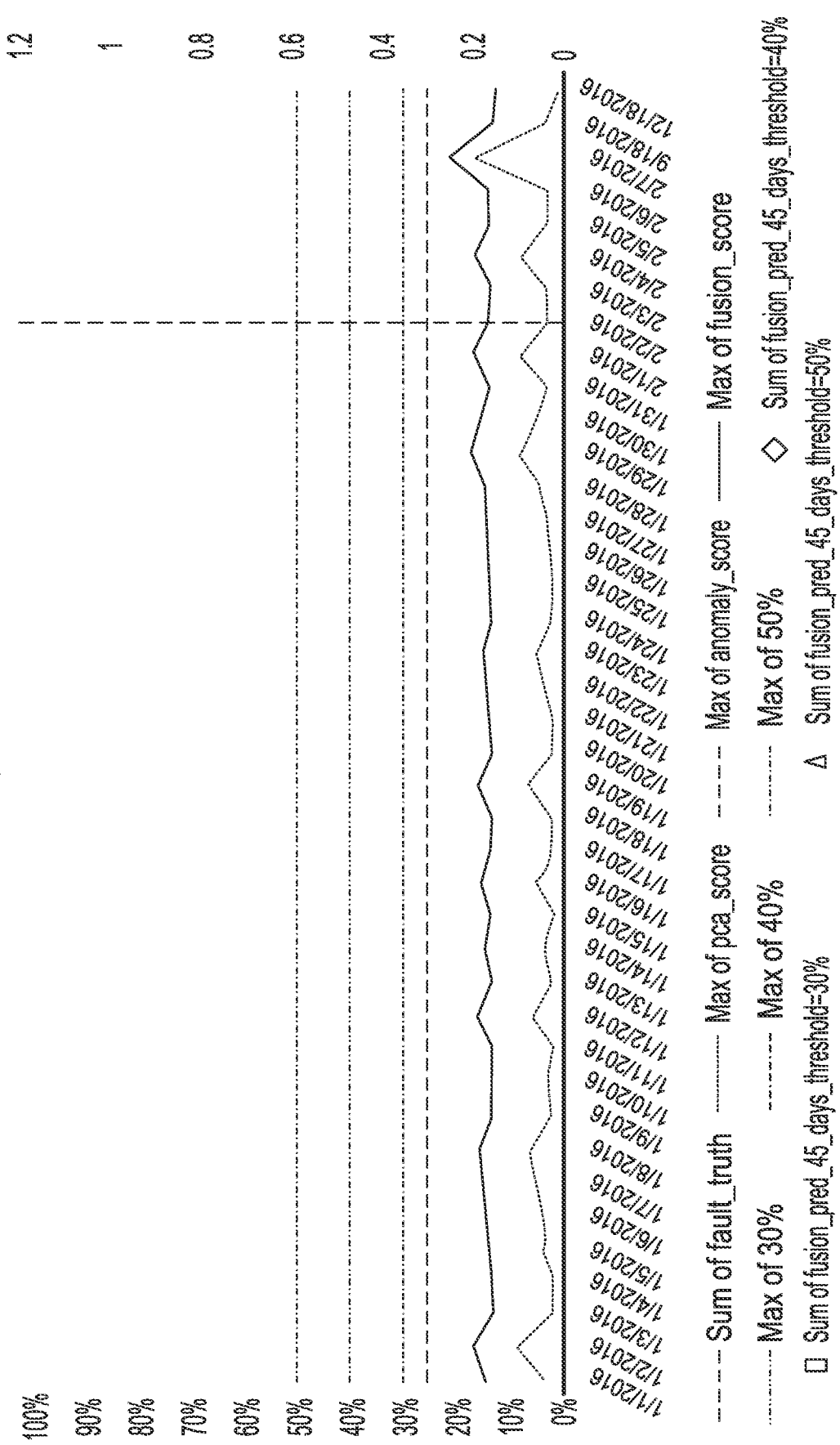
FIG. 12 depicts an example report for fault and prediction analysis for a third electrical asset using information fusion.

FIG. 12 depicts an example report for fault and prediction analysis for a third electrical asset using information fusion. In this example, there are no faults in the historical data, and no faults were predicted using the fault and prediction analysis based on information fusion as discussed herein.

Figure 13:
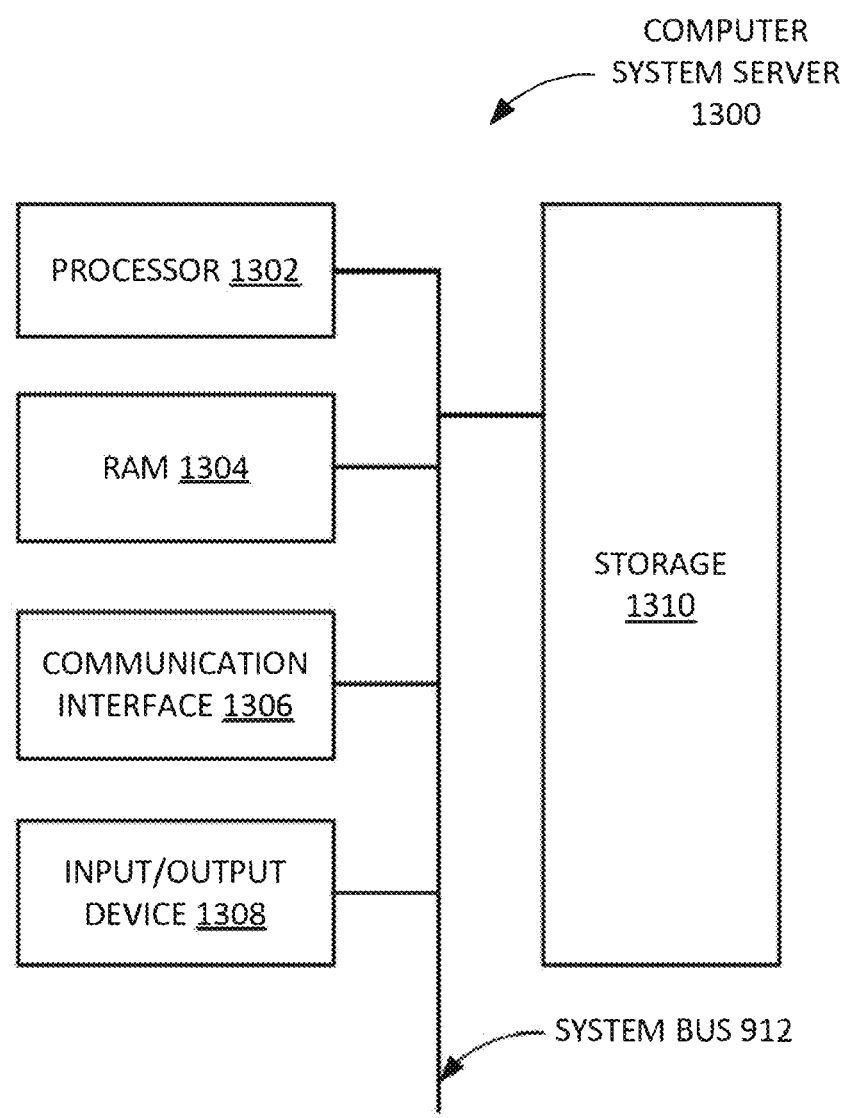
FIG. 13 depicts a block diagram of an example computer system according to some embodiments.

FIG. 13 depicts a block diagram of an example computer system 1300 according to some embodiments. Computer system 1300 is shown in the form of a general-purpose computing device. Computer system 1300 includes processor 1302, RAM 1304, communication interface 1306, input/output device 1308, storage 1310, and a system bus 1312 that couples various system components including storage 1310 to processor 1302.

System bus 1312 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 1300 typically includes a variety of computer system readable media. Such media may be any available media that is accessible by the computer system 1300 and it includes both volatile and nonvolatile media, removable and non-removable media.

In some embodiments, processor 1302 is configured to execute executable instructions (e.g., programs). In some embodiments, the processor 1004 comprises circuitry or any processor capable of processing the executable instructions.

In some embodiments, RAM 1304 stores data. In various embodiments, working data is stored within RAM 1304. The data within RAM 1304 may be cleared or ultimately transferred to storage 1310.

In some embodiments, communication interface 1306 is coupled to a network via communication interface 1306. Such communication can occur via Input/Output (I/O) device 1308. Still yet, the computer system 1300 may communicate with one or more networks such as a local area network (LAN), a general wide area network (WAN), and/or a public network (e.g., the Internet).

In some embodiments, input/output device 1308 is any device that inputs data (e.g., mouse, keyboard, stylus) or outputs data (e.g., speaker, display, virtual reality headset).

In some embodiments, storage 1310 can include computer system readable media in the form of volatile memory, such as read only memory (ROM) and/or cache memory. Storage 1310 may further include other removable/non-removable, volatile/non-volatile computer system storage media. By way of example only, storage 1310 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CDROM, DVD-ROM or other optical media can be provided. In such instances, each can be connected to system bus 1312 by one or more data media interfaces. As will be further depicted and described below, storage 1310 may include at least one program product having a set (e.g., at least one) of program modules that are configured to carry out the functions of embodiments of the invention. In some embodiments, RAM 1304 is found within storage 1310.

Program/utility, having a set (at least one) of program modules, such as those contained within the component failure prediction system 104, may be stored in storage 1310 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein. A module may be hardware (e.g., ASIC, circuitry, and/or the like), software, or a combination of both.

It should be understood that although not shown, other hardware and/or software components could be used in conjunction with the computer system 1300. Examples, include, but are not limited to: microcode, device drivers, redundant processing units, and external disk drive arrays, RAID systems, tape drives, and data archival storage systems, etc.

Exemplary embodiments are described herein in detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of one or more embodiments may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A non-transitory computer readable medium comprising executable instructions, the executable instructions being executable by one or more processors to perform a method, the method comprising:
  receiving historical sensor data of a first time period, the historical sensor data including sensor data from one or more sensors of a renewable energy asset;
  extracting features from the historical sensor data;
  performing a unsupervised anomaly detection technique on the historical sensor data to generate a first set of labels associated with the historical sensor data, the performing comprises:
    generating an anomaly score based on an output of the unsupervised anomaly detection technique;
    comparing the anomaly score to a threshold; and
    generating a label of the first set of labels based on the comparison;
  performing at least one dimensionality reduction technique to generate a second set of labels associated with the historical sensor data, the dimensionality reduction technique reducing a second number of dimensions of the extracted features when compared to a first number of dimensions of the extracted features analyzed using the unsupervised anomaly detection;
  combining at least the label of the first set of labels and one or more labels of the second set of labels to generate combined labels;
  generating one or more models based on supervised machine learning and the combined labels;
  receiving current sensor data of a second time period, the current sensor data including sensor data from at least a subset of the one or more sensors of the renewable energy asset;
  extracting features from the current sensor data;
  applying the one or more models to the extracted features of the current sensor data to create a prediction of a future fault in the renewable energy asset,
  comparing the prediction of the future fault against one or more criteria to determine significance of the future fault, the one or more criteria including a number of failures in close proximity to each other, a total number of failures, significance of risk to the renewable energy asset as a whole, impact to other assets, impact to an electrical network, or impact the future fault has to important service; and
  generating an alert based on the comparison, the alert including the prediction of the future fault in the renewable energy asset.

2. The non-transitory computer readable medium of claim 1, wherein the performing the at least one dimensionality reduction technique to generate the second set of labels comprises:
  generating a z-score based on an output of the at least one dimensionality reduction technique;
  comparing the anomaly score to the threshold; and
  generating a label of the second set of labels based on the comparison.

3. The non-transitory computer readable medium of claim 1, wherein the unsupervised anomaly detection technique includes an isolation forest technique.

4. The non-transitory computer readable medium of claim 1, wherein the at least one dimensionality reduction technique includes a principal component analysis (PCA) technique.

5. The non-transitory computer readable medium of claim 1, wherein combining the at least the label of the first set of labels and the one or more labels of the second set of labels are combined in a complimentary manner.

6. The non-transitory computer readable medium of claim 1, wherein generating one or more models based on supervised machine learning and the combined labels includes K-nearest neighbor algorithm or a neural network.

7. The non-transitory computer readable medium of claim 1, wherein supervised machine learning includes k-means clustering.

8. A system comprising:
  at least one processor; and
  memory containing instructions, the instructions being executable by the at least one processor to:
    receive historical sensor data of a first time period, the historical sensor data including sensor data from one or more sensors of a renewable energy asset;
    extract features from the historical sensor data;
    perform a unsupervised anomaly detection technique on the historical sensor data to generate a first set of labels associated with the historical sensor data, the performing comprises;
      generate an anomaly score based on an output of the unsupervised anomaly detection technique;
      compare the anomaly score to a threshold; and
      generate a label of the first set of labels based on the comparison;
    perform at least one dimensionality reduction technique to generate a second set of labels associated with the historical sensor data, the dimensionality reduction technique reducing a second number of dimensions of the extracted features when compared to a first number of dimensions of the extracted features analyzed using the unsupervised anomaly detection;
    combine at least the label of the first set of labels and one or more labels of the second set of labels to generate combined labels;
    generate one or more models based on supervised machine learning and the combined labels;
    receive current sensor data of a second time period, the current sensor data including sensor data from at least a subset of the one or more sensors of the renewable energy asset;
    extract features from the current sensor data;
    apply the one or more models to the extracted features of the current sensor data to create a prediction of a future fault in the renewable energy asset;
    compare the prediction of the future fault against one or more criteria to determine significance of the future fault, the one or more criteria including a number of failures in close proximity to each other, a total number of failures, significance of risk to the renewable energy asset as a whole, impact to other assets, impact to an electrical network, or impact the future fault has to important service; and
    generating an alert based on the comparison, the alert including the prediction of the future fault in the renewable energy asset.

9. The system of claim 8, wherein the perform the at least one dimensionality reduction technique to generate the second set of labels associated with the historical sensor data comprises:
generating a z-score based on an output of the at least one dimensionality reduction technique;
comparing the anomaly score to the threshold; and
generating a label of the second set of labels based on the comparison.

10. The system of claim 8, wherein the unsupervised anomaly detection technique includes an isolation forest technique.

11. The system of claim 8, wherein the at least one dimensionality reduction technique includes a principal component analysis (PCA) technique.

12. The system of claim 8, wherein combining the at least the label of the first set of labels and the one or more labels of the second set of labels are combined in a complimentary manner.

13. The system of claim 8, wherein generating one or more models based on supervised machine learning and the combined labels includes K-nearest neighbor algorithm or a neural network.

14. The system of claim 8, wherein supervised machine learning includes k-means clustering.

15. A method comprising:
receiving historical sensor data of a first time period, the historical sensor data including sensor data from one or more sensors of a renewable energy asset;
extracting features from the historical sensor data;
performing a unsupervised anomaly detection technique on the historical sensor data to generate a first set of labels associated with the historical sensor data, the performing comprises:
generating an anomaly score based on an output of the unsupervised anomaly detection technique;
comparing the anomaly score to a threshold; and
generating a label of the first set of labels based on the comparison;
performing at least one dimensionality reduction technique to generate a second set of labels associated with the historical sensor data, the dimensionality reduction technique reducing a second number of dimensions of the extracted features when compared to a first number of dimensions of the extracted features analyzed using the unsupervised anomaly detection;
combining at least the label of the first set of labels and one or more labels of the second set of labels to generate combined labels;
generating one or more models based on supervised machine learning and the combined labels;
receiving current sensor data of a second time period, the current sensor data including sensor data from at least a subset of the one or more sensors of the renewable energy asset;
extracting features from the current sensor data;
applying the one or more models to the extracted features of the current sensor data to create a prediction of a future fault in the renewable energy asset,
compare the prediction of the future fault against one or more criteria to determine significance of the future fault, the one or more criteria including a number of failures in close proximity to each other, a total number of failures, significance of risk to the renewable energy asset as a whole, impact to other assets, impact to an electrical network, or impact the future fault has to important service; and
generating an alert based on the comparison, the alert including the prediction of the future fault in the renewable energy asset.

16. The method of claim 15, wherein the performing the at least one dimensionality reduction technique to generate the second set of labels comprises:
generating a z-score based on an output of the at least one dimensionality reduction technique;
comparing the anomaly score to the threshold; and
generating a label of the second set of labels based on the comparison.

17. The method of claim 15, wherein the unsupervised anomaly detection technique includes an isolation forest technique.

18. The method of claim 15, wherein the at least one dimensionality reduction technique includes a principal component analysis (PCA) technique.

* * * * *